US009622087B2

(12) United States Patent
Li et al.

(10) Patent No.: US 9,622,087 B2
(45) Date of Patent: Apr. 11, 2017

(54) SPECTRUM RESOURCE SHARING METHOD, AND BASE STATION

(71) Applicant: Huawei Technologies Co., Ltd., Shenzhen (CN)

(72) Inventors: Xia Li, Shanghai (CN); Ning Hu, Shanghai (CN); Xiaoyan Shi, Shanghai (CN); Han Zhang, Chengdu (CN); Xiaofeng Ren, Shanghai (CN); Liwen Zhang, Shanghai (CN); Liping Yang, Shanghai (CN); Jing Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 98 days.

(21) Appl. No.: 14/752,439

(22) Filed: Jun. 26, 2015

(65) Prior Publication Data

US 2015/0296387 A1   Oct. 15, 2015

Related U.S. Application Data

(63) Continuation of application No. PCT/CN2013/083477, filed on Sep. 13, 2013.

(30) Foreign Application Priority Data

Dec. 27, 2012   (WO) ................ PCT/CN2012/087745

(51) Int. Cl.
*H04W 72/00* (2009.01)
*H04W 16/14* (2009.01)
(Continued)

(52) U.S. Cl.
CPC ....... *H04W 16/14* (2013.01); *H04W 72/0453* (2013.01); *H04W 72/12* (2013.01); *H04W 16/24* (2013.01); *H04W 88/08* (2013.01)

(58) Field of Classification Search
CPC . H04W 16/14; H04W 16/24; H04W 72/0453; H04W 88/08
(Continued)

(56) References Cited

U.S. PATENT DOCUMENTS 5,940,743 A * 8/1999 Sunay ................ H04W 52/283
370/331
6,990,348 B1 * 1/2006 Benveniste .......... H04W 16/10
455/429

(Continued)

FOREIGN PATENT DOCUMENTS

CN         1792101 A    6/2006
CN       101031129 A    9/2007
(Continued)

*Primary Examiner* — Babar Sarwar
(74) *Attorney, Agent, or Firm* — Leydig, Voit & Mayer, Ltd.

(57) ABSTRACT

The present disclosure provides a spectrum resource sharing method and an base station. The method includes: acquiring, by a first-communications standard base station, time and frequency information and power of each second-communications standard channel interfering with the first-communications standard base station; if in one transmission time interval, no frequency number in a shared spectrum is occupied by the second-communications standard channels, using, by the first-communications standard base station, the shared spectrum for uplink and downlink data channel scheduling in the one transmission time interval.

24 Claims, 6 Drawing Sheets

(51) Int. Cl.
*H04W 72/04* (2009.01)
*H04W 72/12* (2009.01)
*H04W 16/24* (2009.01)
*H04W 88/08* (2009.01)

(58) Field of Classification Search
USPC ....... 455/454, 552.1–553.1, 509, 506, 456.1,
455/422.1, 420, 436, 443, 444,
455/450–452.2; 370/280, 328–332, 337,
370/343, 338, 344, 347, 436, 442, 252,
370/458
See application file for complete search history.

(56) References Cited

U.S. PATENT DOCUMENTS

| | | | | |
|---|---|---|---|---|
| 7,555,300 | B2* | 6/2009 | Scheinert | H04W 8/30 370/321 |
| 8,948,110 | B2* | 2/2015 | Roessel | H04L 5/001 370/329 |
| 9,204,310 | B2* | 12/2015 | Ju | H04W 16/14 |
| 2002/0183086 | A1* | 12/2002 | Hellmark | H04W 52/10 455/522 |
| 2004/0161020 | A1* | 8/2004 | Mathew | H04B 1/7083 375/149 |
| 2004/0233888 | A1 | 11/2004 | Bonta et al. | |
| 2006/0292986 | A1* | 12/2006 | Bitran | H04W 16/14 455/41.2 |
| 2007/0111746 | A1* | 5/2007 | Anderson | H04W 52/223 455/522 |
| 2007/0211687 | A1* | 9/2007 | Benjebbour | H04L 27/0008 370/347 |
| 2007/0230497 | A1* | 10/2007 | Choi | H04B 3/542 370/442 |
| 2008/0214199 | A1* | 9/2008 | Ji | H04W 16/10 455/452.1 |
| 2009/0017829 | A1* | 1/2009 | Laroia | H04W 16/12 455/446 |
| 2010/0120359 | A1* | 5/2010 | Agarwal | H04B 7/18539 455/12.1 |
| 2010/0136989 | A1* | 6/2010 | Westerberg | H04W 16/14 455/450 |
| 2010/0159940 | A1* | 6/2010 | Gorokhov | H04L 5/0037 455/450 |
| 2010/0265839 | A1* | 10/2010 | Almgren | H04B 7/15535 370/252 |
| 2011/0096783 | A1 | 4/2011 | Cai et al. | |
| 2011/0205941 | A1* | 8/2011 | Stanforth | H04W 72/0466 370/280 |
| 2011/0249579 | A1* | 10/2011 | Hu | H04L 5/001 370/252 |
| 2012/0149414 | A1* | 6/2012 | Krishnaswamy | H04W 72/1215 455/507 |
| 2013/0162442 | A1* | 6/2013 | Honda | G08C 17/02 340/870.02 |
| 2013/0315183 | A1* | 11/2013 | Xiang | H04W 72/0453 370/329 |
| 2014/0080491 | A1* | 3/2014 | Tinnakornsrisuphap | H04W 24/02 455/438 |
| 2014/0105194 | A1* | 4/2014 | Wiatrowski | H04B 7/2643 370/337 |

FOREIGN PATENT DOCUMENTS

| | | |
|---|---|---|
| CN | 101578898 A | 11/2009 |
| CN | 101690297 A | 3/2010 |
| CN | 101904125 A | 12/2010 |
| CN | 101977388 A | 2/2011 |
| CN | 102104879 A | 6/2011 |
| CN | 102348211 A | 2/2012 |
| CN | 102474749 A | 5/2012 |
| CN | 102651869 A | 8/2012 |
| FI | WO 2010091713 A1 * | 8/2010 ............ H04W 16/14 |
| WO | WO 2009009264 A3 | 1/2009 |
| WO | WO 2010091713 A1 | 8/2010 |

* cited by examiner

SPECTRUM RESOURCE SHARING METHOD, AND BASE STATION

CROSS-REFERENCE TO RELATED APPLICATIONS

This application is a continuation of International Application No. PCT/CN2013/083477, filed on Sep. 13, 2013, which claims priority to International Application No. PCT/CN2012/087745, filed on Dec. 27, 2012, both of which are hereby incorporated by reference in their entireties.

TECHNICAL FIELD

The present disclosure relates to the field of communications technologies, and in particular, to a spectrum resource sharing method and a base station.

BACKGROUND

At present, a Global System for Mobile Communications (GSM) and a Long Term Evolution (LTE) system may share a spectrum resource by using a dynamic spectrum sharing (DSS) technology. The spectrum resource used for sharing is referred to as a shared spectrum, and the shared spectrum may be a part of a spectrum in a GSM frequency band. A process of implementing spectrum resource sharing by using the DSS is as follows:

For a selected network, during busy hours of a GSM service in daytime, the shared spectrum is provided for a GSM cell to implement the GSM service; during off-peak hours of a GSM service at night, the shared spectrum is provided for an LTE cell to implement an LTE service.

However, when a DSS method is used, in a same period of time, the shared spectrum can be provided for only a cell of one communications standard to implement a service, for example, the shared spectrum is provided for a GSM cell to implement a GSM service or is provided for an LTE cell to implement an LTE service. The GSM cell and the LTE cell cannot use the shared spectrum at the same time; therefore, spectrum resource usage is not high.

SUMMARY

The present disclosure provides a spectrum resource sharing method and a base station, which enables cells of different communications standards to simultaneously use a shared spectrum in a same period of time, and increases spectrum resource usage.

The following technical solutions are adopted in the present disclosure to achieve the foregoing disclosure objective:

A first aspect provides a spectrum resource sharing method, including:

acquiring, by a first-communications standard base station, time and frequency information and power of each second-communications standard channel interfering with the first-communications standard base station, where the time and frequency information includes: frequency numbers, timeslot numbers, and Time Division Multiple Access TDMA frame numbers which are obtained when the second-communications standard channels are occupied;

determining, by the first-communications standard base station in one transmission time interval according to the time and frequency information of the second-communications standard channels, whether each frequency number in a shared spectrum is occupied by the second-communications standard channels in a TDMA frame timeslot corresponding to the one transmission time interval; and if in the one transmission time interval, no frequency number in the shared spectrum is occupied by the second-communications standard channels, using, by the first-communications standard base station, the shared spectrum for uplink and downlink data channel scheduling in the one transmission time interval.

With reference to the first aspect, in a first implementation manner of the first aspect, when the first-communications standard base station uses the shared spectrum to perform the uplink and downlink data channel scheduling in the one transmission time interval, an order of a modulation and coding scheme MCS used is not limited.

With reference to the first aspect or the first implementation manner of the first aspect, in a second implementation manner of the first aspect, if in the one transmission time interval, one or more frequency numbers in the shared spectrum are occupied by the second-communications standard channels, the first-communications standard base station calculates, by using power of the second-communications standard channels that occupy the one or more frequency numbers, a signal to interference plus noise ratio SINR of the one or more frequency numbers; when the SINR of the one or more frequency numbers is greater than a first threshold, the shared spectrum is used for the uplink and downlink data channel scheduling in the one transmission time interval, and the order of the MCS used when the first-communications standard base station performs the uplink and downlink data channel scheduling is determined according to the SINR of the one or more frequency numbers.

With reference to the second implementation manner of the first aspect, in a third implementation manner of the first aspect, that the order of the MCS used when the first-communications standard base station performs the uplink and downlink data channel scheduling is determined according to the SINR of the one or more frequency numbers includes:

when the SINR of the one or more frequency numbers is greater than the first threshold but is less than or equal to a second threshold, determining that the order of the MCS used when the first-communications standard base station performs the uplink and downlink data channel scheduling is a target order, where data encoded by using the MCS with the target order can resist interference from the second-communications standard channels during transmission; and when the SINR of the one or more frequency numbers is greater than the second threshold, determining that the order of the MCS used when the first-communications standard base station performs the uplink and downlink data channel scheduling is not limited.

With reference to the first aspect or any one of the foregoing implementation manners of the first aspect, in a fourth implementation manner of the first aspect, the acquiring, by a first-communications standard base station, time and frequency information and power of each second-communications standard channel interfering with the first-communications standard base station includes:

receiving, by the first-communications standard base station, the time and frequency information and the power of each second-communications standard channel interfering with the first-communications standard base station that are sent by a target network element, where the target network element is any one of the following network elements: a second-communications standard base station controller, an inter-communications standard coordination controller that supports a first communications standard and a second communications standard, a second-communications standard base station, a multimode base station that supports the first communications standard and the second communications standard, or another first-communications standard base station that is adjacent to the first-communications standard base station.

A second aspect provides a spectrum resource sharing method, including:

acquiring, by a first-communications standard base station, frequency domain information and power of each second-communications standard channel interfering with the first-communications standard base station, where the frequency domain information includes: frequency numbers which are obtained when the second-communications standard channels are occupied;

determining, by the first-communications standard base station according to the frequency domain information of the second-communications standard channels, whether each frequency number in a shared spectrum is occupied by the second-communications standard channels; and if no frequency number in the shared spectrum is occupied by the second-communications standard channels, using, by the first-communications standard base station, the shared spectrum for uplink and downlink data channel scheduling in current one transmission time interval.

With reference to the second aspect, in a first implementation manner of the second aspect, when the first-communications standard base station uses the shared spectrum to perform the uplink and downlink data channel scheduling in the current one transmission time interval, an order of an MCS used is not limited.

With reference to the second aspect or the first implementation manner of the second aspect, in a second implementation manner of the second aspect, the first-communications standard base station acquires time domain information of each second-communications standard channel interfering with the first-communications standard base station, where the time domain information includes: timeslot numbers and Time Division Multiple Access TDMA frame numbers which are obtained when the second-communications standard channels are occupied.

With reference to the second implementation manner of the second aspect, in a third implementation manner of the second aspect, if one or more frequency numbers in the shared spectrum are occupied by the second-communications standard channels, the first-communications standard base station determines, according to the time domain information and the frequency domain information of the second-communications standard channels, whether the one or more frequency numbers are occupied by the second-communications standard channels in a TDMA frame timeslot corresponding to the one transmission time interval;

if the one or more frequency numbers are not occupied by the second-communications standard channels in the TDMA frame timeslot corresponding to the one transmission time interval, the first-communications standard base station uses the shared spectrum for the uplink and downlink data channel scheduling, and the order of the MCS used when the first-communications standard base station performs the uplink and downlink data channel scheduling is not limited; and if the one or more frequency numbers are occupied by the second-communications standard channels in the TDMA frame timeslot corresponding to the one transmission time interval, the first-communications standard base station calculates, by using power of the second-communications standard channels that occupy the one or more frequency numbers, a signal to interference plus noise ratio SINR of the one or more frequency numbers; when the SINR of the one or more frequency numbers is greater than a first threshold, the shared spectrum is used for the uplink and downlink data channel scheduling in the one transmission time interval, and the order of the MCS used when the first-communications standard base station performs the uplink and downlink data channel scheduling is determined according to the SINR of the one or more frequency numbers.

With reference to the second or the third implementation manner of the second aspect, in a fourth implementation manner of the second aspect, the acquiring, by a first-communications standard base station, frequency domain information and power of each second-communications standard channel interfering with the first-communications standard base station includes:

receiving, by the first-communications standard base station, the frequency domain information and the power of each second-communications standard channel interfering with the first-communications standard base station that are sent by a target network element; and that the first-communications standard base station acquires time domain information of each second-communications standard channel interfering with the first-communications standard base station includes:

receiving, by the first-communications standard base station, the time domain information of each second-communications standard channel interfering with the first-communications standard base station that is sent by the target network element, where the target network element is any one of the following network elements: a second-communications standard base station controller, an inter-communications standard coordination controller that supports a first communications standard and a second communications standard, a second-communications standard base station, a multimode base station that supports the first communications standard and the second communications standard, or another first-communications standard base station that is adjacent to the first-communications standard base station.

A third aspect provides a base station, where the base station is a first-communications standard base station, including:

an acquiring module, configured to acquire time and frequency information and power of each second-communications standard channel interfering with the first-communications standard base station, where the time and frequency information includes: frequency numbers, timeslot numbers, and Time Division Multiple Access TDMA frame numbers which are obtained when the second-communications standard channels are occupied;

a determining module, configured to determine, in one transmission time interval according to the time and frequency information of the second-communications standard channels, whether each frequency number in a shared spectrum is occupied by the second-communications standard channels in a TDMA frame timeslot corresponding to the one transmission time interval; and a resource allocating module, configured to: if the determining module determines that in the one transmission time interval, no frequency number in the shared spectrum is occupied by the second-communications standard channels, enable the first-communications standard base station to use the shared spectrum for uplink and downlink data channel scheduling in the one transmission time interval.

With reference to the third aspect, in a first implementation manner of the third aspect, when the first-communications standard base station uses the shared spectrum to perform the uplink and downlink data channel scheduling in the one transmission time interval, an order of a modulation and coding scheme MCS used is not limited.

With reference to the third aspect or the first implementation manner of the third aspect, in a second implementation manner of the third aspect, the resource allocating unit is further configured to: if in the one transmission time interval, one or more frequency numbers in the shared spectrum are occupied by the second-communications standard channels, enable the first-communications standard base station to calculate, by using power of the second-communications standard channels that occupy the one or more frequency numbers, a signal to interference plus noise ratio SINR of the one or more frequency numbers; when the SINR of the one or more frequency numbers is greater than a first threshold, use the shared spectrum for the uplink and downlink data channel scheduling in the one transmission time interval, and determine, according to the SINR of the one or more frequency numbers, the order of the MCS used when the first-communications standard base station performs the uplink and downlink data channel scheduling.

With reference to the second implementation manner of the third aspect, in a third implementation manner of the third aspect, the resource allocating unit is specifically configured to: when the SINR of the one or more frequency numbers is greater than the first threshold but is less than or equal to a second threshold, determine that the order of the MCS used when the first-communications standard base station performs the uplink and downlink data channel scheduling is a target order, where data encoded by using the MCS with the target order can resist interference from the second-communications standard channels during transmission; and the resource allocating unit is further specifically configured to: when the SINR of the one or more frequency numbers is greater than the second threshold, determine that the order of the MCS used when the first-communications standard base station performs the uplink and downlink data channel scheduling is not limited.

With reference to the third aspect or any one of the foregoing implementation manners of the third aspect, in a fourth implementation manner of the third aspect, the acquiring module is specifically configured to receive the time and frequency information and the power of each second-communications standard channel interfering with the first-communications standard base station that are sent by a target network element, where the target network element is any one of the following network elements: a second-communications standard base station controller, an inter-communications standard coordination controller that supports a first communications standard and a second communications standard, a second-communications standard base station, a multimode base station that supports the first communications standard and the second communications standard, or another first-communications standard base station that is adjacent to the first-communications standard base station.

A fourth aspect provides a base station, where the base station is a first-communications standard base station, including:

an acquiring module, configured to acquire frequency domain information and power of each second-communications standard channel interfering with the first-communications standard base station, where the frequency domain information includes: frequency numbers which are obtained when the second-communications standard channels are occupied;

a determining module, configured to determine, according to the frequency domain information of the second-communications standard channels, whether each frequency number in a shared spectrum is occupied by the second-communications standard channels; and a resource allocating module, configured to: if the determining module determines that no frequency number in the shared spectrum is occupied by the second-communications standard channels, enable the first-communications standard base station to use the shared spectrum for uplink and downlink data channel scheduling in current one transmission time interval.

With reference to the fourth aspect, in a first implementation manner of the fourth aspect, when the first-communications standard base station uses the shared spectrum to perform the uplink and downlink data channel scheduling in the current one transmission time interval, an order of an MCS used is not limited.

With reference to the fourth aspect or the first implementation manner of the fourth aspect, in a second implementation manner of the fourth aspect, the acquiring module is further configured to acquire time domain information of each second-communications standard channel interfering with the first-communications standard base station, where the time domain information includes: timeslot numbers and Time Division Multiple Access TDMA frame numbers which are obtained when the second-communications standard channels are occupied.

With reference to the second implementation manner of the fourth aspect, in a third implementation manner of the fourth aspect, the determining module is further configured to: if one or more frequency numbers in the shared spectrum are occupied by the second-communications standard channels, determine, according to the time domain information and the frequency domain information of the second-communications standard channels, whether the one or more frequency numbers are occupied by the second-communications standard channels in a TDMA frame timeslot corresponding to the one transmission time interval;

the resource allocating module is further configured to: if the determining module determines that the one or more frequency numbers are not occupied by the second-communications standard channels in the TDMA frame timeslot corresponding to the one transmission time interval, use the shared spectrum for the uplink and downlink data channel scheduling, where the order of the MCS used when the first-communications standard base station performs the uplink and downlink data channel scheduling is not limited; and the resource allocating module is further configured to: if the determining module determines that the one or more frequency numbers are occupied by the second-communications standard channels in the TDMA frame timeslot corresponding to the one transmission time interval, calculate, by using power of the second-communications standard channels that occupy the one or more frequency numbers, a signal to interference plus noise ratio SINR of the one or more frequency numbers; when the SINR of the one or more frequency numbers is greater than a first threshold, use the shared spectrum for the uplink and downlink data channel scheduling in the one transmission time interval, and determine, according to the SINR of the one or more frequency numbers, the order of the MCS used when the first-communications standard base station performs the uplink and downlink data channel scheduling.

With reference to the second or the third implementation manner of the fourth aspect, in a fourth implementation manner of the fourth aspect, the acquiring module is specifically configured to receive the time domain information, the frequency domain information, and the power of each second-communications standard channel interfering with the first-communications standard base station that are sent by a target network element, where the target network element is any one of the following network elements: a second-communications standard base station controller, an inter-communications standard coordination controller that supports a first communications standard and a second communications standard, a second-communications standard base station, a multimode base station that supports the first communications standard and the second communications standard, or another first-communications standard base station that is adjacent to the first-communications standard base station.

A fifth aspect provides a base station, where the base station is a first-communications standard base station, including:

a receiver, configured to acquire time and frequency information and power of each second-communications standard channel interfering with the first-communications standard base station, where the time and frequency information includes: frequency numbers, timeslot numbers, and Time Division Multiple Access TDMA frame numbers which are obtained when the second-communications standard channels are occupied; and a processor, configured to determine, in one transmission time interval according to the time and frequency information of the second-communications standard channels, whether each frequency number in a shared spectrum is occupied by the second-communications standard channels in a TDMA frame timeslot corresponding to the one transmission time interval, where the processor is further configured to: if it is determined that in the one transmission time interval, no frequency number in the shared spectrum is occupied by the second-communications standard channels, enable the first-communications standard base station to use the shared spectrum for uplink and downlink data channel scheduling in the one transmission time interval.

With reference to the fifth aspect, in a first implementation manner of the fifth aspect, when the first-communications standard base station uses the shared spectrum to perform the uplink and downlink data channel scheduling in the one transmission time interval, an order of a modulation and coding scheme MCS used is not limited.

With reference to the fifth aspect or the first implementation manner of the fifth aspect, in a second implementation manner of the fifth aspect, the processor is further configured to: if it is determined that in the one transmission time interval, one or more frequency numbers in the shared spectrum are occupied by the second-communications standard channels, enable the first-communications standard base station to calculate, by using power of the second-communications standard channels that occupy the one or more frequency numbers, a signal to interference plus noise ratio SINR of the one or more frequency numbers; when the SINR of the one or more frequency numbers is greater than a first threshold, use the shared spectrum for the uplink and downlink data channel scheduling in the one transmission time interval, and determine, according to the SINR of the one or more frequency numbers, the order of the MCS used when the first-communications standard base station performs the uplink and downlink data channel scheduling.

With reference to the second implementation manner of the fifth aspect, in a third implementation manner of the fifth aspect, the processor is specifically configured to: when the SINR of the one or more frequency numbers is greater than the first threshold but is less than or equal to a second threshold, determine that the order of the MCS used when the first-communications standard base station performs the uplink and downlink data channel scheduling is a target order, where data encoded by using the MCS with the target order can resist interference from the second-communications standard channels during transmission; and the processor is further specifically configured to: when the SINR of the one or more frequency numbers is greater than the second threshold, determine that the order of the MCS used when the first-communications standard base station performs the uplink and downlink data channel scheduling is not limited.

With reference to the fifth aspect or any one of the foregoing implementation manners of the fifth aspect, in a fourth implementation manner of the fifth aspect, the receiver is specifically configured to receive the time and frequency information and the power of each second-communications standard channel interfering with the first-communications standard base station that are sent by a target network element, where the target network element is any one of the following network elements: a second-communications standard base station controller, an inter-communications standard coordination controller that supports a first communications standard and a second communications standard, a second-communications standard base station, a multimode base station that supports the first communications standard and the second communications standard, or another first-communications standard base station that is adjacent to the first-communications standard base station.

A sixth aspect provides a base station, where the base station is a first-communications standard base station, including:

a receiver, configured to acquire frequency domain information and power of each second-communications standard channel interfering with the first-communications standard base station, where the frequency domain information includes: frequency numbers which are obtained when the second-communications standard channels are occupied; and a processor, configured to determine, according to the frequency domain information of the second-communications standard channels, whether each frequency number in a shared spectrum is occupied by the second-communications standard channels, where the processor is further configured to: if it is determined that no frequency number in the shared spectrum is occupied by the second-communications standard channels, enable the first-communications standard base station to use the shared spectrum for uplink and downlink data channel scheduling in current one transmission time interval.

With reference to the sixth aspect, in a first implementation manner of the sixth aspect, when the first-communications standard base station uses the shared spectrum to perform the uplink and downlink data channel scheduling in the current one transmission time interval, an order of an MCS used is not limited.

With reference to the sixth aspect or the first implementation manner of the sixth aspect, in a second implementation manner of the sixth aspect, the receiver is further configured to acquire time domain information of each second-communications standard channel interfering with the first-communications standard base station, where the time domain information includes: timeslot numbers and Time Division Multiple Access TDMA frame numbers which are obtained when the second-communications standard channels are occupied.

With reference to the second implementation manner of the sixth aspect, in a third implementation manner of the sixth aspect, the processor is further configured to: if it is determined that one or more frequency numbers in the shared spectrum are occupied by the second-communications standard channels, determine, according to the time domain information and the frequency domain information of the second-communications standard channels, whether the one or more frequency numbers are occupied by the second-communications standard channels in a TDMA frame timeslot corresponding to the one transmission time interval;

the processor is further configured to: if it is determined that the one or more frequency numbers are not occupied by the second-communications standard channels in the TDMA frame timeslot corresponding to the one transmission time interval, use the shared spectrum for the uplink and downlink data channel scheduling, where the order of the MCS used when the first-communications standard base station performs the uplink and downlink data channel scheduling is not limited; and the processor is further configured to: if it is determined that the one or more frequency numbers are occupied by the second-communications standard channels in the TDMA frame timeslot corresponding to the one transmission time interval, calculate, by using power of the second-communications standard channels that occupy the one or more frequency numbers, a signal to interference plus noise ratio SINR of the one or more frequency numbers; when the SINR of the one or more frequency numbers is greater than a first threshold, use the shared spectrum for the uplink and downlink data channel scheduling in the one transmission time interval, and determine, according to the SINR of the one or more frequency numbers, the order of the MCS used when the first-communications standard base station performs the uplink and downlink data channel scheduling.

With reference to the second or the third implementation manner of the sixth aspect, in a fourth implementation manner of the sixth aspect, the receiver is specifically configured to receive the time domain information, the frequency domain information, and the power of each second-communications standard channel interfering with the first-communications standard base station that are sent by a target network element, where the target network element is any one of the following network elements: a second-communications standard base station controller, an inter-communications standard coordination controller that supports a first communications standard and a second communications standard, a second-communications standard base station, a multimode base station that supports the first communications standard and the second communications standard, or another first-communications standard base station that is adjacent to the first-communications standard base station.

A seventh aspect provides a spectrum resource sharing method, including:

acquiring, by a first-communications standard base station, frequency domain information of each second-communications standard channel interfering with the first-communications standard base station, where the frequency domain information includes: frequency numbers which are obtained when the second-communications standard channels are occupied;

determining, by the first-communications standard base station according to the frequency domain information of the second-communications standard channels, whether one or more frequency numbers in a shared spectrum are occupied by the second-communications standard channels; and if no frequency number in the shared spectrum is occupied by the second-communications standard channels, using, by the first-communications standard base station, the shared spectrum for uplink and downlink data channel scheduling in current one transmission time interval.

An eighth aspect provides a spectrum resource sharing method, including:

acquiring, by a first-communications standard base station, time domain information of each second-communications standard channel interfering with the first-communications standard base station, where the time domain information includes: timeslot numbers and/or Time Division Multiple Access TDMA frame numbers which are obtained when the second-communications standard channels are occupied;

determining, by the first-communications standard base station in one transmission time interval, whether a shared spectrum is occupied by the second-communications standard channels in a TDMA frame timeslot corresponding to the one transmission time interval; and if in the one transmission time interval, the shared spectrum is not occupied by the second-communications standard channels, using, by the first-communications standard base station, the shared spectrum for uplink and downlink data channel scheduling in the one transmission time interval.

A ninth aspect provides a base station, where the base station is a first-communications standard base station, including:

an acquiring module, configured to acquire frequency domain information of each second-communications standard channel interfering with the first-communications standard base station, where the frequency domain information includes: frequency numbers which are obtained when the second-communications standard channel are occupied;

a determining module, configured to determine, according to the frequency domain information of the second-communications standard channels, whether one or more frequency numbers in a shared spectrum are occupied by the second-communications standard channels; and a resource allocating module, configured to: when no frequency number in the shared spectrum is occupied by the second-communications standard channels, enable the first-communications standard base station to use the shared spectrum for uplink and downlink data channel scheduling in current one transmission time interval.

A tenth aspect provides a base station, where the base station is a first-communications standard base station, including:

an acquiring module, configured to acquire time domain information of each second-communications standard channel interfering with the first-communications standard base station, where the time domain information includes: timeslot numbers and/or Time Division Multiple Access TDMA frame numbers which are obtained when the second-communications standard channels are occupied;

a determining module, configured to: in one transmission time interval, determine whether a shared spectrum is occupied by the second-communications standard channels in a TDMA frame timeslot corresponding to the one transmission time interval; and a resource allocating module, configured to: when in the one transmission time interval, the shared spectrum is not occupied by the second-communications standard channels, enable the first-communications standard base station to use the shared spectrum for uplink and downlink data channel scheduling in the one transmission time interval.

An eleventh aspect provides a base station, where the base station is a first-communications standard base station, including:

a receiver, configured to acquire frequency domain information of each second-communications standard channel interfering with the first-communications standard base station, where the frequency domain information includes: frequency numbers which are obtained when the second-communications standard channels are occupied; and a processor, configured to determine, according to the frequency domain information of the second-communications standard channels, whether one or more frequency numbers in a shared spectrum are occupied by the second-communications standard channels, where the processor is further configured to: when no frequency number in the shared spectrum is occupied by the second-communications standard channels, enable the first-communications standard base station to use the shared spectrum for uplink and downlink data channel scheduling in current one transmission time interval.

A twelfth aspect provides a base station, where the base station is a first-communications standard base station, including:

a receiver, configured to acquire time domain information of each second-communications standard channel interfering with the first-communications standard base station, where the time domain information includes: timeslot numbers and/or Time Division Multiple Access TDMA frame numbers which are obtained when the second-communications standard channels are occupied; and a processor, configured to: in one transmission time interval, determine whether a shared spectrum is occupied by the second-communications standard channels in a TDMA frame timeslot corresponding to the one transmission time interval, where the processor is further configured to: when in the one transmission time interval, the shared spectrum is not occupied by the second-communications standard channels, enable the first-communications standard base station to use the shared spectrum for uplink and downlink data channel scheduling in the one transmission time interval.

According to the forgoing technical solutions, in embodiments of the present disclosure, in one transmission time interval, it may be determined, according to time and frequency information of a second-communications standard channel, whether each frequency number in a shared spectrum is occupied by the second-communications standard channel in a TDMA frame timeslot corresponding to the one transmission time interval; if in the one transmission time interval, no frequency number in the shared spectrum is occupied by the second-communications standard channel, a first-communications standard base station may use the shared spectrum for uplink and downlink data channel scheduling in the one transmission time interval; otherwise, the shared spectrum is still used by a second-communications standard base station, that is, the shared spectrum is dynamically used by a first communications standard and a second communications standard in different transmission time intervals. Compared with the prior art where in one transmission time interval, cells of different communications standards cannot simultaneously use a shared spectrum, the embodiments of the present disclosure enable cells of different communications standards to simultaneously use a shared spectrum in a same period of time, which increases spectrum resource usage.

In addition, in a method in the prior art, to decrease co-channel interference between an LTE cell that uses a shared spectrum and a GSM cell that does not use the shared spectrum, a buffer area needs to be set between the LTE cell that uses the shared spectrum and the GSM cell that does not use the shared spectrum. A cell located in the buffer area cannot use the shared spectrum, which also reduces the spectrum resource usage. However, in the embodiments of the present disclosure, when it is implemented that cells of different communications standards simultaneously use a shared spectrum, a frequency number selected from the shared spectrum is not occupied by the second-communications standard channel or is occupied but an SINR of the frequency number is greater than a first threshold (that is, frequency interference from the second-communications standard channel to the frequency number is relatively low and can be resisted by using an MCS with a target order); therefore it is not required to set a buffer area, which increases the spectrum resource usage.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The embodiments of the present disclosure provide a spectrum resource sharing method, in which resource allocation may be performed on a shared spectrum in a unified manner only in a time domain, in a time domain first and then in a frequency domain, only in a frequency domain, or in a frequency domain first and then in a time domain, so as to implement spectrum resource sharing among different communications standards.

In this specification, a first communications standard and a second communications standard are two different communications standards. A method provided in the following describes in detail how to implement spectrum resource sharing between the first communications standard and the second communications standard.

The first communications standard may be any one of the following communications standards: LTE frequency division duplex (FDD) or LTE time division duplex (TDD); the second communications standard may be any one of the following communications standards: GSM, Universal Mobile Telecommunications System (UMTS), and Time Division-Synchronous Code Division Multiple Access (TD-SCDMA).

Alternatively, the first communications standard is UMTS or TD-SCDMA; the second communications standard is GSM.

Figure 1:
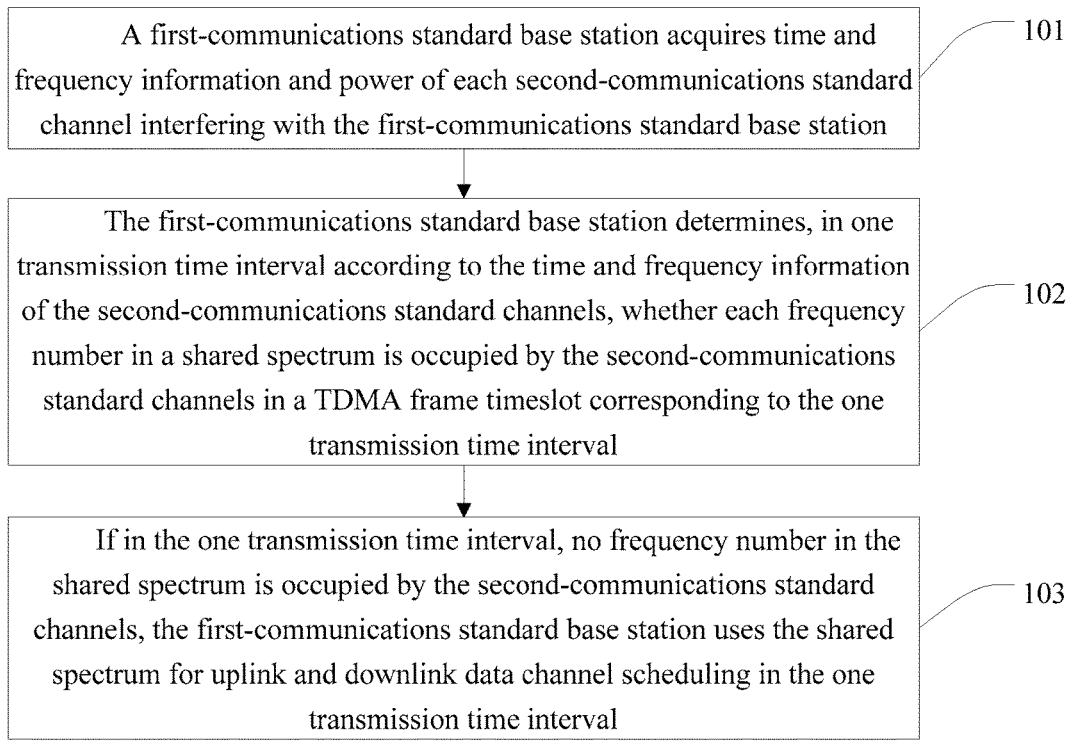
FIG. 1 is a first flowchart of a spectrum resource sharing method according to an embodiment of the present disclosure.

As shown in FIG. 1, a spectrum resource sharing method is described in detail by using an example in which resource allocation is performed on a shared spectrum in a unified manner only in a time domain to implement spectrum resource sharing among different communications standards, and the method includes:

101. A first-communications standard base station acquires time and frequency information and power of each second-communications standard channel interfering with the first-communications standard base station.

The time-frequency information includes: frequency numbers, timeslot numbers, and Time Division Multiple Access (TDMA) frame numbers which are obtained when the second-communications standard channels are occupied.

The second-communications standard channels may be channels in a second-communications standard base station or second-communications standard channels in a multimode base station that supports a first communications standard and a second communications standard.

It should be noted that, when a second-communications standard channel is occupied, for example, in a second-communications standard cell, the second-communications standard channel is occupied in cases in which a user equipment starts an outgoing call, starts an incoming call, hands over to the second-communications standard cell, or the like, in these cases, an update of a channel resource is triggered in the second-communications standard cell; similarly, when a second-communications standard channel is released, for example, in a second-communications standard cell, the second-communications standard channel is released in cases in which a user equipment ends a call or is handed over from the second-communications standard cell to another cell, in these cases, an update of a channel resource is also triggered in the second-communications standard cell. The channel resource is updated when a channel is occupied or released, and the updated channel resource may record, in real time, the time and frequency information of each second-communications standard channel that is currently occupied. In addition, a cell has a fixed number of available channels; therefore, when the time and frequency information of each second-communications standard channel that is currently occupied is recorded, second-communications standard channels that are not occupied may also be learned.

Further, the time and frequency information, which is of each second-communications standard channel that is currently occupied and is recorded in a channel resource updated each time, and the power of each second-communications standard channel may be periodically sent by a target network element to the first-communications standard base station, where the target network element may be: a second-communications standard base station controller, an inter-communications standard coordination controller that supports the first communications standard and the second communications standard, a second-communications standard base station, a multimode base station that supports the first communications standard and the second communications standard, or another first-communications standard base station that is adjacent to the first-communications standard base station.

The second-communications standard base station and the multimode base station that supports the first communications standard and the second communications standard may directly obtain the channel resource updated each time; the second-communications standard base station may periodically send the channel resource updated each time to a second-communications standard base station controller; the second-communications standard base station controller may further periodically send the channel resource updated each time to an inter-communications standard coordination controller that supports the first communications standard and the second communications standard (for example, an eCoordinator); the multimode base station may also send the channel resource updated each time to another first-communications standard base station that is adjacent to the first-communications standard base station. Therefore, the second-communications standard base station controller, the inter-communications standard coordination controller that supports the first communications standard and the second communications standard, and the another first-communications standard base station that is adjacent to the first-communications standard base station may also obtain the channel resource updated each time.

Therefore, this step may be replaced by the following manner: The first-communications standard base station receives the time and frequency information and power of each second-communications standard channel interfering with the first-communications standard base station that are sent by the target network element.

For example, when the first communications standard is LTE FDD and the second communications standard is GSM, the step is specifically as follows: An eNodeB receives time and frequency information and power of each GSM channel interfering with the eNodeB that are sent by a GSM base station controller (GSM Base Station Controller, GBSC) (or an inter-communications standard coordination controller that supports GSM and LTE, or a GSM base station, or a multimode base station (Multimode Base Station, MBTS), or another eNodeB that is adjacent to the eNodeB).

102. The first-communications standard base station determines, in one transmission time interval according to the time and frequency information of the second-communications standard channels, whether each frequency number in a shared spectrum is occupied by the second-communications standard channels in a TDMA frame timeslot corresponding to the one transmission time interval.

When the first communications standard is LTE FDD and the second communications standard is GSM, one transmission time interval of LTE is 1 ms, and one TDMA frame of GSM may be divided into eight timeslots for transmission, where each timeslot is 0.577 ms. Generally, one transmission time interval of LTE may correspond to two or three timeslots in one TDMA frame.

The shared spectrum may be a part of a spectrum divided from a second-communications standard frequency band. For example, when the first communications standard is LTE FDD and the second communications standard is GSM, a part of a spectrum is divided from a GSM frequency band as a shared spectrum of LTE FDD and GSM.

103. If in the one transmission time interval, no frequency number in the shared spectrum is occupied by the second-communications standard channels, the first-communications standard base station uses the shared spectrum for uplink and downlink data channel scheduling in the one transmission time interval.

An order of a modulation and coding scheme MCS used when the first-communications standard base station performs the uplink and downlink data channel scheduling is not limited.

For example, the order of the MCS includes 29 orders ranging from 0 to 28. When the uplink and downlink data channel scheduling is performed, if an MCS with a higher order is used, a transmission rate of data encoded by the MCS is higher.

In this step, that an order of a modulation and coding scheme MCS used when the first-communications standard base station performs the uplink and downlink data channel scheduling is not limited indicates that the first-communications standard base station may select, from orders 0 to 28, any order that is of the MCS and meets a requirement of the first-communications standard base station itself When the first-communications standard base station uses the shared spectrum for the uplink and downlink data channel scheduling in the one transmission time interval, frequency numbers of the shared spectrum that are specifically used for the uplink and downlink data channel scheduling are determined by the first-communications standard base station according to an application requirement.

It should be noted that, when the resource allocation is performed on the shared spectrum in the unified manner only in the time domain to implement the spectrum resource sharing, if in the one transmission time interval, one or more frequency numbers in the shared spectrum are occupied by the second-communications standard channels, the first-communications standard base station does not use the shared spectrum for the uplink and downlink data channel scheduling in the one transmission time interval.

In this embodiment of the present disclosure, in one transmission time interval, it may be determined, according to time and frequency information of a second-communications standard channel, whether each frequency number in a shared spectrum is occupied by the second-communications standard channel in a TDMA frame timeslot corresponding to the one transmission time interval; if in the one transmission time interval, no frequency number in the shared spectrum is occupied by the second-communications standard channel, a first-communications standard base station may use the shared spectrum for uplink and downlink data channel scheduling in the one transmission time interval; otherwise, the shared spectrum is still used by a second-communications standard base station, that is, the shared spectrum is dynamically used by a first communications standard and a second communications standard in different transmission time intervals. Compared with the prior art where in one transmission time interval, cells of different communications standards cannot simultaneously use a shared spectrum, this embodiment of the present disclosure enables cells of different communications standards to simultaneously use a shared spectrum in a same period of time, which increases spectrum resource usage.

Further, based on the method, shown in FIG. 1, in which the resource allocation is performed on the shared spectrum in the unified manner only in the time domain to implement the spectrum resource sharing, the resource allocation may further be performed on the shared spectrum in a unified manner in a frequency domain again, that is, the spectrum resource sharing is implemented in the time domain first and then in the frequency domain, so as to further increase the spectrum resource usage.

Figure 1A:
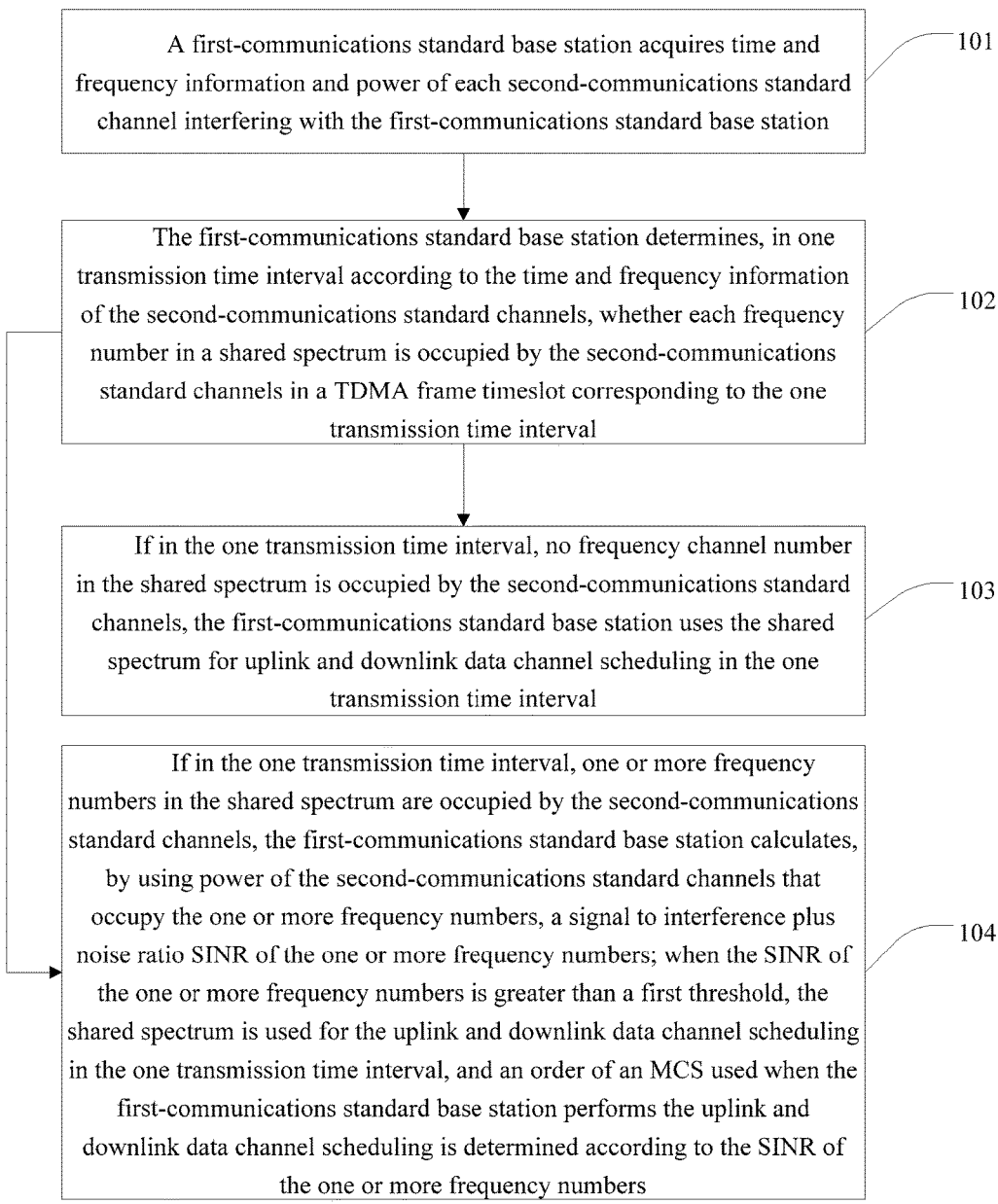
FIG. 1a is a second flowchart of a spectrum resource sharing method according to an embodiment of the present disclosure.

As shown in FIG. 1a, the method further includes:

104. If in the one transmission time interval, one or more frequency numbers in the shared spectrum are occupied by the second-communications standard channels, the first-communications standard base station calculates, by using power of the second-communications standard channels that occupy the one or more frequency numbers, a Signal to Interference plus Noise Ratio (SINR) of the one or more frequency numbers; when the SINR of the one or more frequency numbers is greater than a first threshold, the shared spectrum is used for the uplink and downlink data channel scheduling in the one transmission time interval, and an order of an MCS used when the first-communications standard base station performs the uplink and downlink data channel scheduling is determined according to the SINR of the one or more frequency numbers.

A larger value of the SINR indicates that the one or more frequency numbers are affected by lower interference from the second-communications standard channels; on the contrary, a smaller value of the SINR indicates that the lower interference frequency numbers are affected by higher interference from the second-communications standard channels.

For example, when the value of the SINR>23, it indicates that interference from the second-communications standard channels to the one or more frequency numbers is extremely low and can almost be ignored.

When −6≤the value of the SINR≤23, it indicates that the interference from the second-communications standard channels to the one or more frequency numbers falls within a bearable range.

When the value of the SINR≤−6, it indicates that the interference from the second-communications standard channels to the one or more frequency numbers is extremely high.

Specific implementation of determining, according to the value of the SINR of the one or more frequency numbers, the order of the MCS used when the first-communications standard base station performs the uplink and downlink data channel scheduling is as follows:

Manner 1: When the SINR of the one or more frequency numbers is greater than the first threshold but is less than or equal to a second threshold, it is determined that the order of the MCS used when the first-communications standard base station performs the uplink and downlink data channel scheduling is a target order, where data encoded by using the MCS with the target order can resist interference from the second-communications standard channels during transmission.

For example, when the first threshold is −6 and the second threshold is 23, if −6≤the value of the SINR≤23, it indicates that the interference from the second-communications standard channels to the one or more frequency numbers falls within the bearable range, and the MCS with the target order needs to be used when the first-communications standard base station performs the uplink and downlink data channel scheduling, so that the data encoded by the first-communications standard base station by using the MCS with the target order can resist the interference from the second-communications standard channels when the data is transmitted in the one transmission time interval by using the shared spectrum.

Manner 2: When the SINR of the one or more frequency numbers is greater than the second threshold, it is determined that the order of the MCS used when the first-communications standard base station performs the uplink and downlink data channel scheduling is not limited.

For example, when the first threshold is −6 and the second threshold is 23, if the value of the SINR>23, it indicates that the interference from the second-communications standard channels to the one or more frequency numbers is extremely low and can almost be ignored. Therefore, the first-communications standard base station may select, from the orders 0 to 28, any order that is of the MCS and meets a requirement of the first-communications standard base station itself.

It should be noted that, if the value of the SINR of the one or more frequency numbers is not greater than the first threshold, for example, the value of the SINR<−6, it indicates that the interference from the second-communications standard channels to the one or more frequency numbers is extremely high. In this case, when the first-communications standard base station performs the uplink and downlink data channel scheduling, the shared spectrum is not used in the one transmission time interval.

In the following, with reference to a schematic diagram of a spectrum resource shown in FIG. 2, spectrum resource sharing may be implemented based on the method in the foregoing FIG. 1 and FIG. 1a. A horizontal coordinate represents transmission duration of a TDMA frame, and the transmission duration is divided into eight timeslots; a vertical coordinate represents each frequency number in a shared spectrum. Lines that pass through each timeslot and are perpendicular to the horizontal coordinate, and lines that pass through each frequency number and are perpendicular to the vertical coordinate divide the eight timeslots on the horizontal coordinate and a spectrum resource formed by each frequency number in the shared spectrum on the vertical coordinate into several resource blocks (RB).

Figure 2:
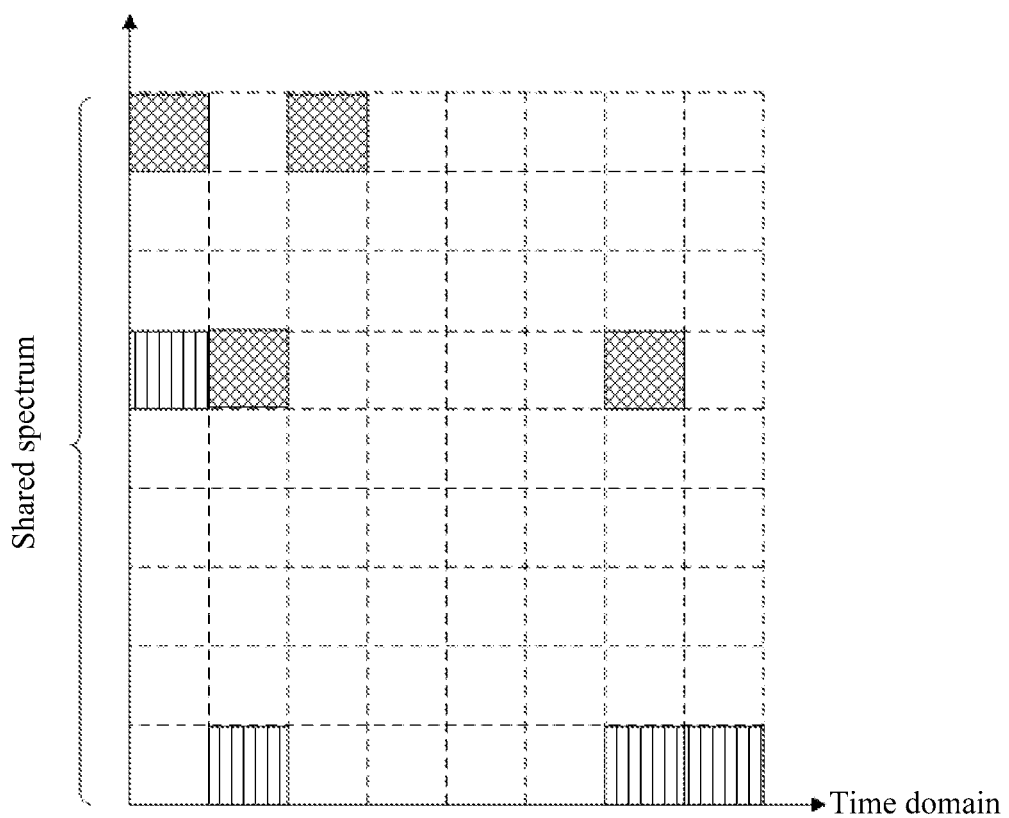
FIG. 2 is a schematic diagram of a spectrum resource according to an embodiment of the present disclosure.

In FIG. 2, each small block represents one RB, and one RB represents one frequency number resource in one timeslot.

A small blank block indicates that a frequency number represented by the RB is not occupied by the second-communications standard channels or that the frequency number represented by the RB is occupied by the second-communications standard channels but the SINR is greater than the second threshold (for example, the value of the SINR>23). The order of the MCS used when the first-communications standard base station uses an RB represented by a small blank block to perform the uplink and downlink data channel scheduling is not limited; therefore, the RB represented by the small blank block may also be referred to as a completely available RB.

For example, if a TDMA timeslot corresponding to one transmission time interval of the first-communications standard base station is timeslots represented by the $4^{th}$-$6^{th}$ columns, because all the $4^{th}$-$6^{th}$ columns are small blank blocks, the first-communications standard base station can use each frequency number in the shared spectrum to perform the uplink and downlink data channel scheduling in the one transmission time interval, and the order of the MCS used is not limited.

A small block with cross slashes indicates that the RB is occupied by the second-communications standard channels and that the SINR of the RB is not greater than the second threshold but is greater than the first threshold (for example, −6≤the value of the SINR≤23). The MCS with the target order needs to be used when the first-communications standard base station uses an RB represented by a small block with cross slashes to perform the uplink and downlink data channel scheduling; therefore, the RB represented by the small block with cross slashes may also be referred to as a conditionally available RB.

For example, if a TDMA timeslot corresponding to one transmission time interval of the first-communications standard base station is timeslots represented by the $3^{th}$-$4^{th}$ columns, because there is a small block with cross slashes in the $3^{th}$ column, the MCS with the target order needs to be used when the first-communications standard base station uses the shared spectrum to perform the uplink and downlink data channel scheduling in the one transmission time interval.

A small block with vertical lines indicates that the RB is occupied by the second-communications standard channels and that the SINR of the RB is not greater than the first threshold (for example, the value of the SINR<−6). An RB represented by a small block with vertical lines is not used when the first-communications standard base station performs the uplink and downlink data channel scheduling; therefore, the RB represented by the small block with vertical lines is also referred to as a completely unavailable RB.

In this embodiment of the present disclosure, in one transmission time interval, it may be determined, according to time and frequency information of a second-communications standard channel, whether each frequency number in a shared spectrum is occupied by the second-communications standard channel in a TDMA frame timeslot corresponding to the one transmission time interval; if in the one transmission time interval, no frequency number in the shared spectrum is occupied by the second-communications standard channel, or a frequency number in the shared spectrum is occupied but an SINR of the frequency number is greater than a first threshold (that is, interference from the second-communications standard channel to the frequency number is relatively low and can be resisted by using an MCS with a target order), a first-communications standard base station may use the shared spectrum for uplink and downlink data channel scheduling in the one transmission time interval. Compared with the prior art where in one transmission time interval, cells of different communications standards cannot simultaneously use a shared spectrum, this embodiment of the present disclosure enables cells of different communications standards to simultaneously use a shared spectrum in a same period of time, which increases spectrum resource usage.

In addition, in a method in the prior art, to decrease co-channel interference between an LTE cell that uses a shared spectrum and a GSM cell that does not use the shared spectrum, a buffer area needs to be set between the LTE cell that uses the shared spectrum and the GSM cell that does not use the shared spectrum. A cell located in the buffer area cannot use the shared spectrum, which also reduces the spectrum resource usage. However, in this embodiment of the present disclosure, when it is implemented that cells of different communications standards simultaneously use a shared spectrum, a frequency number selected from the shared spectrum is not occupied by the second-communications standard channel or is occupied but an SINR of the frequency number is greater than the first threshold (that is, frequency interference from the second-communications standard channel to the frequency number is relatively low and can be resisted by using the MCS with the target order); therefore it is not required to set a buffer area, which increases the spectrum resource usage.

In the embodiment shown in the foregoing FIG. 1, how to implement the spectrum resource sharing among different communications standards is described by using an example in which the resource allocation is performed on the shared spectrum in the unified manner only in the time domain. In the embodiment shown in the foregoing FIG. 1a, how to implement the spectrum resource sharing among different communications standards is described by using an example in which the resource allocation is performed on the shared spectrum in the time domain first and then in the frequency domain.

In the following, how to implement the spectrum resource sharing among different communications standards is described separately by using an example in which the resource allocation is performed on the shared spectrum only in the frequency domain, and by using an example in which the resource allocation is performed on the shared spectrum in the frequency domain first and then in the time domain.

Figure 3:
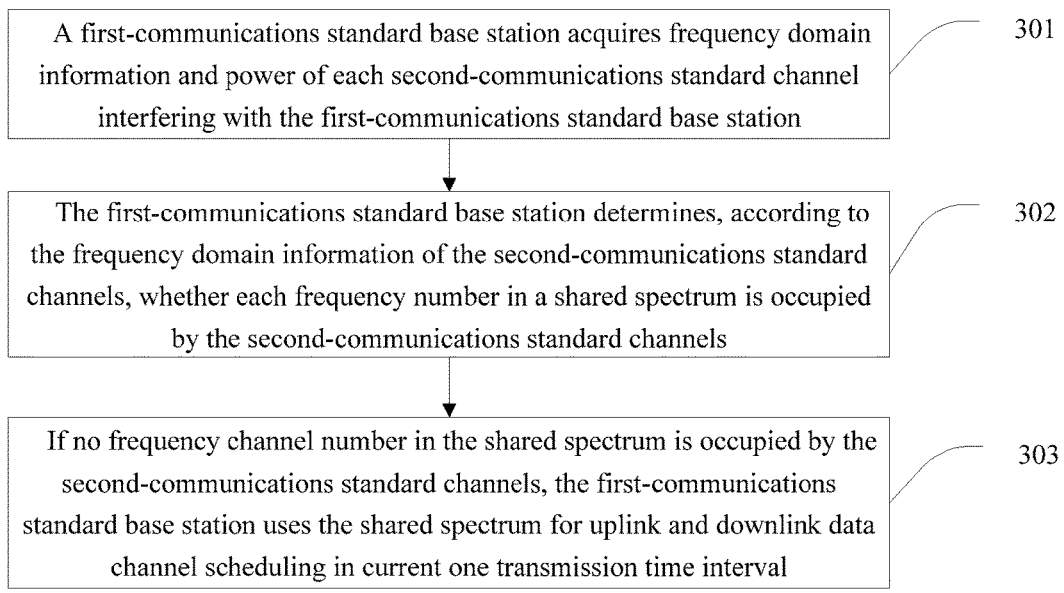
FIG. 3 is a third flowchart of a spectrum resource sharing method according to an embodiment of the present disclosure.

As shown in FIG. 3, a spectrum resource sharing method is described in detail by using the example in which the resource allocation is performed on the shared spectrum in a unified manner only in the frequency domain to implement the spectrum resource sharing among different communications standards, and the method includes:

301. A first-communications standard base station acquires frequency domain information and power of each second-communications standard channel interfering with the first-communications standard base station.

The frequency domain information includes: frequency numbers which are obtained when the second-communications standard channels are occupied.

The second-communications standard channels may be channels in a second-communications standard base station or second-communications standard channels in a multimode base station that supports a first communications standard and a second communications standard.

For a manner of acquiring the frequency domain information and the power of each second-communications standard channel interfering with the first-communications standard base station, refer to descriptions in step 101.

This step may be replaced by the following manner: The first-communications standard base station receives the frequency domain information and the power of each second-communications standard channel interfering with the first-communications standard base station that are sent by a target network element.

The target network element includes: a second-communications standard base station controller, an inter-communications standard coordination controller that supports the first communications standard and the second communications standard, a second-communications standard base station, a multimode base station that supports the first communications standard and the second communications standard, and another first-communications standard base station that is adjacent to the first-communications standard base station.

302. The first-communications standard base station determines, according to the frequency domain information of the second-communications standard channels, whether each frequency number in the shared spectrum is occupied by the second-communications standard channels.

For descriptions about a transmission time interval, a timeslot, and the shared spectrum, refer to step 202.

303. If no frequency number in the shared spectrum is occupied by the second-communications standard channels, the first-communications standard base station uses the shared spectrum for uplink and downlink data channel scheduling in current one transmission time interval.

An order of an MCS used when the first-communications standard base station performs the uplink and downlink data channel scheduling is not limited.

It should be noted that, when the resource allocation is performed on the shared spectrum in the unified manner only in the frequency domain to implement the spectrum resource sharing, if one or more frequency numbers in the shared spectrum are occupied by the second-communications standard channels and as long as one or more frequency numbers are occupied by the second-communications standard channels, the first-communications standard base station does not use the shared spectrum for the uplink and downlink data channel scheduling in the one transmission time interval.

In this embodiment of the present disclosure, it may be determined, according to frequency domain information of a second-communications standard channel, whether each frequency number in a shared spectrum is occupied by the second-communications standard channel; if no frequency number in the shared spectrum is occupied by the second-communications standard channel, a first-communications standard base station uses the shared spectrum for uplink and downlink data channel scheduling in current one transmission time interval; otherwise, the shared spectrum is still used by the second-communications standard channel, that is, the shared spectrum is dynamically used by a first communications standard and a second communications standard in different transmission time intervals. Compared with the prior art where in a same period of time, cells of different communications standards cannot simultaneously use a shared spectrum, this embodiment of the present disclosure enables cells of different communications standards to simultaneously use a shared spectrum in a same period of time, which increases spectrum resource usage.

In addition, in a method in the prior art, to decrease co-channel interference between an LTE cell that uses a shared spectrum and a GSM cell that does not use the shared spectrum, a buffer area needs to be set between the LTE cell that uses the shared spectrum and the GSM cell that does not use the shared spectrum. A cell located in the buffer area cannot use the shared spectrum, which also reduces the spectrum resource usage. However, in this embodiment of the present disclosure, when it is implemented that cells of different communications standards simultaneously use a shared spectrum, a frequency number selected from the shared spectrum is not occupied by the second-communications standard channel; therefore it is not required to set a buffer area, which increases the spectrum resource usage.

Further, based on the method, shown in FIG. 3, in which the resource allocation is performed on the shared spectrum in the unified manner only in the frequency domain to implement the spectrum resource sharing, the resource allocation may further be performed on the shared spectrum in a unified manner in a time domain again, that is, the spectrum resource sharing is implemented in the frequency domain first and then in the time domain, so as to further increase the spectrum resource usage.

Figure 4:
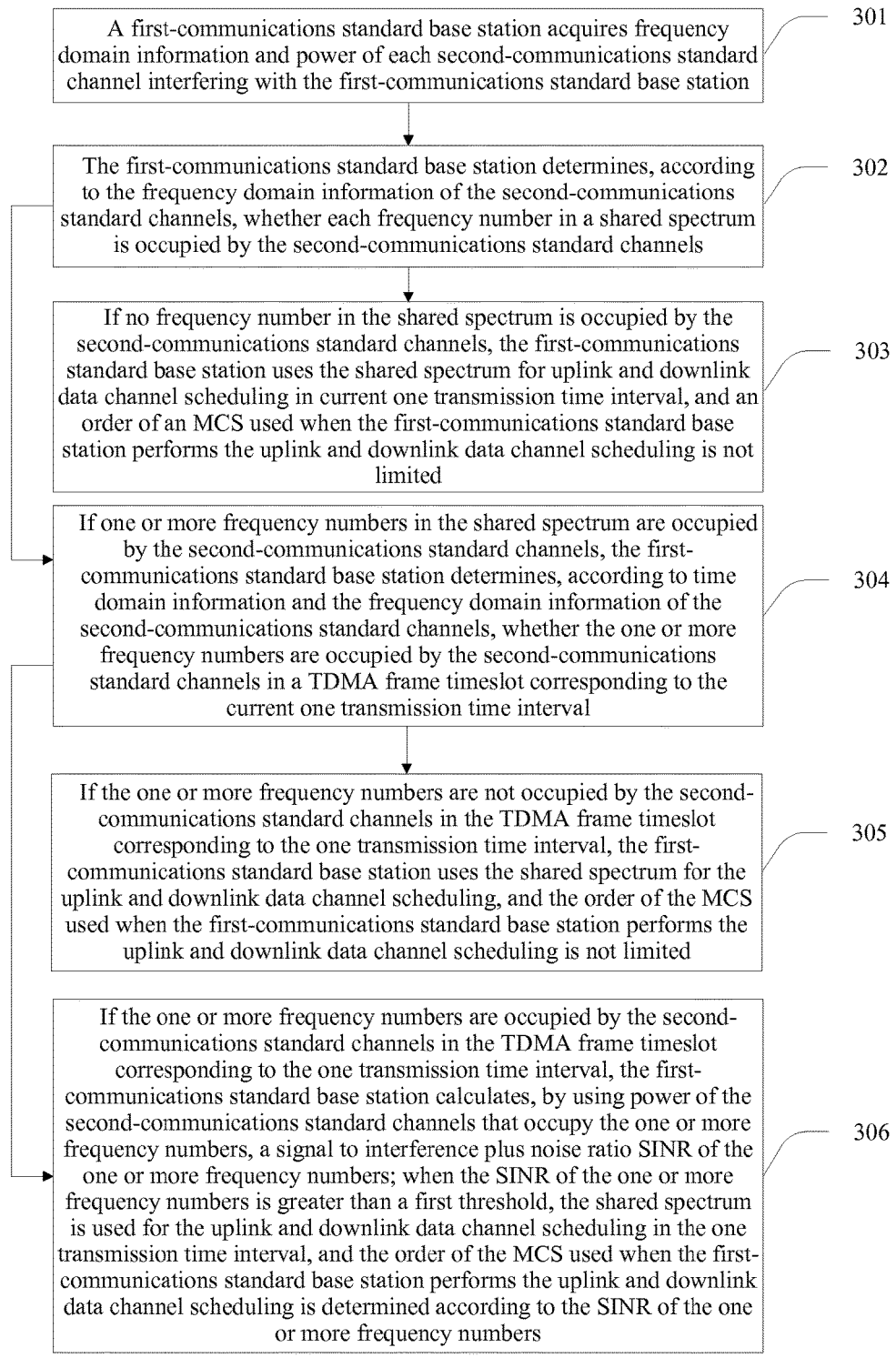
FIG. 4 is a fourth flowchart of a spectrum resource sharing method according to an embodiment of the present disclosure.

As shown in FIG. 4, in step 301, the first-communications standard base station may further acquire time domain information of each second-communications standard channel interfering with the first-communications standard base station. The time domain information includes: timeslot numbers and Time Division Multiple Access TDMA frame numbers which are obtained when the second-communications standard channels are occupied.

The method further includes:

304. If one or more frequency numbers in the shared spectrum are occupied by the second-communications standard channels, the first-communications standard base station determines, according to the time domain information and the frequency domain information of the second-communications standard channels, whether the one or more frequency numbers are occupied by the second-communications standard channels in a TDMA frame timeslot corresponding to the current one transmission time interval.

For the transmission time interval and a TDMA frame timeslot in this step, refer to descriptions in step 102.

305. If the one or more frequency numbers are not occupied by the second-communications standard channels in the TDMA frame timeslot corresponding to the one transmission time interval, the first-communications standard base station uses the shared spectrum for the uplink and downlink data channel scheduling, and the order of the MCS used when the first-communications standard base station performs the uplink and downlink data channel scheduling is not limited.

306. If the one or more frequency numbers are occupied by the second-communications standard channels in the TDMA frame timeslot corresponding to the one transmission time interval, the first-communications standard base station calculates, by using power of the second-communications standard channels that occupy the one or more frequency numbers, a signal to interference plus noise ratio SINR of the one or more frequency numbers; when the SINR of the one or more frequency numbers is greater than a first threshold, the shared spectrum is used for the uplink and downlink data channel scheduling in the one transmission time interval, and the order of the MCS used when the first-communications standard base station performs the uplink and downlink data channel scheduling is determined according to the SINR of the one or more frequency numbers.

For that the order of the MCS used when the first-communications standard base station performs the uplink and downlink data channel scheduling is determined according to the SINR of the one or more frequency numbers, refer to related descriptions in step 104.

In this embodiment of the present disclosure, it may be determined, according to frequency domain information of a second-communications standard channel, whether each frequency number in a shared spectrum is occupied by the second-communications standard channel; if no frequency number in the shared spectrum is occupied by the second-communications standard channel, a first-communications standard base station uses the shared spectrum for uplink and downlink data channel scheduling in current one transmission time interval; otherwise, it is further determined, in a time domain, whether a frequency number is occupied by the second-communications standard channel in a TDMA frame timeslot corresponding to the current one transmission time interval, and if the frequency number is not occupied or is occupied but an SINR of the frequency number is greater than a first threshold, the shared spectrum is used for the uplink and downlink data channel scheduling in the one transmission time interval. Compared with the prior art where in a same period of time, cells of different communications standards cannot simultaneously use a shared spectrum, this embodiment of the present disclosure enables cells of different communications standards to simultaneously use a shared spectrum in a same period of time, which increases spectrum resource usage.

In addition, in a method in the prior art, to decrease co-channel interference between an LTE cell that uses a shared spectrum and a GSM cell that does not use the shared spectrum, a buffer area needs to be set between the LTE cell that uses the shared spectrum and the GSM cell that does not use the shared spectrum. A cell located in the buffer area cannot use the shared spectrum, which also reduces the spectrum resource usage. However, in this embodiment of the present disclosure, when it is implemented that cells of different communications standards simultaneously use a shared spectrum, a frequency number selected from the shared spectrum is not occupied by the second-communications standard channel; therefore it is not required to set a buffer area, which increases the spectrum resource usage.

In the embodiments shown in FIG. 1 to FIG. 4, implementation of the spectrum resource sharing methods is described. Correspondingly, the following describes in detail embodiments of apparatuses that can implement the spectrum resource sharing methods.

Figure 5:
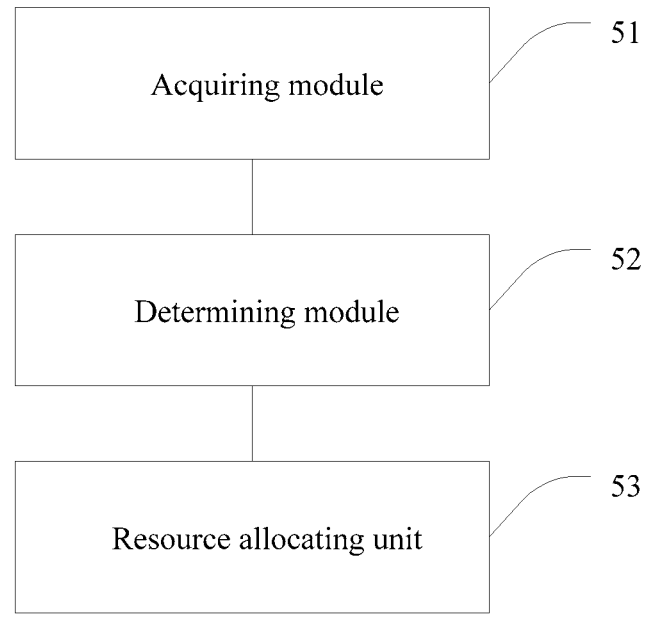
FIG. 5 is a first structural diagram of a base station according to an embodiment of the present disclosure.

As shown in FIG. 5, an embodiment of the present disclosure provides a base station. The base station is a first-communications standard base station and can perform resource allocation on a shared spectrum in a unified manner only in a time domain to implement spectrum resource sharing among different communications standards.

The base station includes:

an acquiring module 51, configured to acquire time and frequency information and power of each second-communications standard channel interfering with the first-communications standard base station, where the time and frequency information includes: frequency numbers, timeslot numbers, and Time Division Multiple Access TDMA frame numbers which are obtained when the second-communications standard channels are occupied, where the second-communications standard channels may be channels in a second-communications standard base station or second-communications standard channels in a multi-mode base station that supports a first communications standard and a second communications standard;

a determining module 52, configured to determine, in one transmission time interval according to the time and frequency information of the second-communications standard channels, whether each frequency number in a shared spectrum is occupied by the second-communications standard channels in a TDMA frame timeslot corresponding to the one transmission time interval; and a resource allocating unit 53, configured to: if the determining module determines that in the one transmission time interval, no frequency number in the shared spectrum is occupied by the second-communications standard channels, enable the first-communications standard base station to use the shared spectrum for uplink and downlink data channel scheduling in the one transmission time interval, where an order of a modulation and coding scheme MCS used when the first-communications standard base station performs the uplink and downlink data channel scheduling is not limited.

In this embodiment of the present disclosure, in one transmission time interval, it may be determined, according to time and frequency information of a second-communications standard channel, whether each frequency number in a shared spectrum is occupied by the second-communications standard channel in a TDMA frame timeslot corresponding to the one transmission time interval; if in the one transmission time interval, no frequency number in the shared spectrum is occupied by the second-communications standard channel, a first-communications standard base station may use the shared spectrum for uplink and downlink data channel scheduling in the one transmission time interval; otherwise, the shared spectrum is still used by a second-communications standard base station, that is, the shared spectrum is dynamically used by a first communications standard and a second communications standard in different transmission time intervals. Compared with the prior art where in one transmission time interval, cells of different communications standards cannot simultaneously use a shared spectrum, this embodiment of the present disclosure enables cells of different communications standards to simultaneously use a shared spectrum in a same period of time, which increases spectrum resource usage.

The base station shown in FIG. 5 performs the resource allocation on the shared spectrum in the unified manner only in the time domain to implement the spectrum resource sharing among different communications standards, and reference may further be made to related descriptions in the method shown in FIG. 1.

Further, on the basis that the base station shown in FIG. 5 performs the resource allocation on the shared spectrum in the unified manner only in the time domain to implement the spectrum resource sharing, the base station may further perform the resource allocation on the shared spectrum in a unified manner in a frequency domain again, that is, the base station implements the spectrum resource sharing in the time domain first and then in the frequency domain, so as to further increase the spectrum resource usage. Specific implementation is as follows:

The resource allocating unit 53 is further configured to: if one or more frequency numbers in the shared spectrum are occupied by the second-communications standard channels in the one transmission time interval, enable the first-communications standard base station to calculate, by using power of the second-communications standard channels that occupy the one or more frequency numbers, a signal to interference plus noise ratio SINR of the one or more frequency numbers; when the SINR of the one or more frequency numbers is greater than a first threshold, use the shared spectrum for the uplink and downlink data channel scheduling in the one transmission time interval, and determine, according to the SINR of the one or more frequency numbers, the order of the MCS used when the first-communications standard base station performs the uplink and downlink data channel scheduling.

For implementation of a function of the resource allocating unit, refer to related descriptions in steps 103 to 104 and in FIG. 2.

Further, the resource allocating unit 53 is specifically configured to: when the SINR of the one or more frequency numbers is greater than the first threshold but is less than or equal to a second threshold, determine that the order of the MCS used when the first-communications standard base station performs the uplink and downlink data channel scheduling is a target order, where data encoded by using the MCS with the target order can resist interference from the second-communications standard channels during transmission.

The resource allocating unit 53 is further specifically configured to: when the SINR of the one or more frequency numbers is greater than the second threshold, determine that the order of the MCS used when the first-communications standard base station performs the uplink and downlink data channel scheduling is not limited.

Further, the acquiring module 51 is specifically configured to receive the time and frequency information and the power of each second-communications standard channel interfering with the first-communications standard base station that are sent by a target network element.

The target network element is any one of the following network elements: a second-communications standard base station controller, an inter-communications standard coordination controller that supports a first communications standard and a second communications standard, a second-communications standard base station, a multimode base station that supports the first communications standard and the second communications standard, or another first-communications standard base station that is adjacent to the first-communications standard base station.

The base station shown in FIG. 5 performs the resource allocation on the shared spectrum in the time domain first and then in the frequency domain, so as to implement the spectrum resource sharing among different communications standards, and reference may be made to related descriptions in the method shown in FIG. 1a.

An embodiment of the present disclosure further provides a base station. The base station is a first-communications standard base station and can perform resource allocation on a shared spectrum in a unified manner only in a frequency domain to implement spectrum resource sharing among different communications standards.

The base station provided by this embodiment of the present disclosure may implement the spectrum resource sharing among different communications standards by using a structure shown in FIG. 5.

The embodiment of the base station shown in FIG. 5 is described by emphasizing manners of performing the resource allocation only in a time domain and performing the resource allocation in the time domain first and then in a frequency domain, whereas this embodiment of the present disclosure is described by emphasizing manners of performing the resource allocation only in a frequency domain and performing the resource allocation in the frequency domain first and then in a time domain.

The base station includes:

an acquiring module, configured to acquire frequency domain information and power of each second-communications standard channel interfering with the first-communications standard base station, where the frequency domain information includes: frequency numbers which are obtained when the second-communications standard channels are occupied, where the second-communications standard channels may be channels in a second-communications standard base station or second-communications standard channels in a multimode base station that supports a first communications standard and a second communications standard, and for a manner of acquiring time and frequency information and the power of each second-communications standard channel interfering with the first-communications standard base station, refer to descriptions in step 101;

a determining module, configured to determine, according to the frequency domain information of the second-communications standard channels, whether each frequency number in the shared spectrum is occupied by the second-communications standard channels, where for descriptions about a transmission time interval, a timeslot, and the shared spectrum, refer to step 102; and a resource allocating module, configured to: if the determining module determines that no frequency number in the shared spectrum is occupied by the second-communications standard channels, enable the first-communications standard base station to use the shared spectrum for uplink and downlink data channel scheduling, where an order of an MCS used when the first-communications standard base station performs the uplink and downlink data channel scheduling is not limited.

Frequency numbers in the shared spectrum that are specifically used by the resource allocating module are determined by the first-communications standard base station according to an application requirement.

For implementation of a function of the resource allocating module, refer to descriptions in step 303.

In this embodiment of the present disclosure, it may be determined, according to frequency domain information of a second-communications standard channel, whether each frequency number in a shared spectrum is occupied by the second-communications standard channel; if no frequency number in the shared spectrum is occupied by the second-communications standard channel, a first-communications standard base station uses the shared spectrum for uplink and downlink data channel scheduling in current one transmission time interval; otherwise, the shared spectrum is still used by the second-communications standard channel, that is, the shared spectrum is dynamically used by a first communications standard and a second communications standard in different transmission time intervals. Compared with the prior art where in a same period of time, cells of different communications standards cannot simultaneously use a shared spectrum, this embodiment of the present disclosure enables cells of different communications standards to simultaneously use a shared spectrum in a same period of time, which increases spectrum resource usage.

In this embodiment, the base station performs the resource allocation on the shared spectrum in the unified manner only in the frequency domain to implement the spectrum resource sharing among different communications standards, and reference may be made to related descriptions in the method shown in FIG. 3.

Further, on the basis that the base station performs the resource allocation on the shared spectrum in the unified manner only in the frequency domain to implement the spectrum resource sharing, the base station may further perform the resource allocation on the shared spectrum in a unified manner in a time domain again, that is, the base station implements the spectrum resource sharing in the frequency domain first and then in the time domain, so as to further increase the spectrum resource usage. Specific implementation is as follows:

The acquiring module is further configured to acquire time domain information of each second-communications standard channel interfering with the first-communications standard base station, where the time domain information includes: timeslot numbers and Time Division Multiple Access TDMA frame numbers which are obtained when the second-communications standard channels are occupied.

Further, the determining module is further configured to: if one or more frequency numbers in the shared spectrum are occupied by the second-communications standard channels, determine, according to the time domain information and the frequency domain information of the second-communications standard channels, whether the one or more frequency numbers are occupied by the second-communications standard channels in a TDMA frame timeslot corresponding to one transmission time interval.

The resource allocating module is further configured to: if the determining module determines that the one or more frequency numbers are not occupied by the second-communications standard channels in the TDMA frame timeslot corresponding to the one transmission time interval, use the shared spectrum for the uplink and downlink data channel scheduling, where the order of the MCS used when the first-communications standard base station performs the uplink and downlink data channel scheduling is not limited.

The resource allocating module is further configured to: if the determining module determines that the one or more frequency numbers are occupied by the second-communications standard channels in the TDMA frame timeslot corresponding to the one transmission time interval, calculate, by using power of the second-communications standard channels that occupy the one or more frequency numbers, a signal to interference plus noise ratio SINR of the one or more frequency numbers; when the SINR of the one or more frequency numbers is greater than a first threshold, use the shared spectrum for the uplink and downlink data channel scheduling in the one transmission time interval, and determine, according to the SINR of the one or more frequency numbers, the order of the MCS used when the first-communications standard base station performs the uplink and downlink data channel scheduling.

Further, the acquiring module is specifically configured to receive the time domain information, the frequency domain information, and the power of each second-communications standard channel interfering with the first-communications standard base station that are sent by a target network element.

The target network element is any one of the following network elements: a second-communications standard base station controller, an inter-communications standard coordination controller that supports a first communications standard and a second communications standard, a second-communications standard base station, a multimode base station that supports the first communications standard and the second communications standard, or another first-communications standard base station that is adjacent to the first-communications standard base station.

For example, when the first-communications standard base station is an eNodeB in LTE, the target network element may be any one of the following network elements: a GBSC, an inter-communications standard coordination controller that supports GSM and LTE (for example, an eCoordinator), a base station in GSM, an MBTS, or another eNodeB that is adjacent to the eNodeB.

In this embodiment, the base station performs the resource allocation on the shared spectrum in the frequency domain first and then in the time domain, so as to implement the spectrum resource sharing among different communications standards, and reference may be made to related descriptions in the method shown in FIG. 4.

In this embodiment of the present disclosure, it may be determined, according to frequency domain information of a second-communications standard channel, whether each frequency number in a shared spectrum is occupied by the second-communications standard channel; if no frequency number in the shared spectrum is occupied by the second-communications standard channel, a first-communications standard base station uses the shared spectrum for uplink and downlink data channel scheduling in current one transmission time interval; otherwise, it is further determined, in a time domain, whether a frequency number is occupied by the second-communications standard channel in a TDMA frame timeslot corresponding to the current one transmission time interval, and if the frequency number is not occupied or is occupied but an SINR of the frequency number is greater than a first threshold, the shared spectrum is used for the uplink and downlink data channel scheduling in the one transmission time interval. Compared with the prior art where in a same period of time, cells of different communications standards cannot simultaneously use a shared spectrum, this embodiment of the present disclosure enables cells of different communications standards to simultaneously use a shared spectrum in a same period of time, which increases spectrum resource usage.

In addition, in a method in the prior art, to decrease co-channel interference between an LTE cell that uses a shared spectrum and a GSM cell that does not use the shared spectrum, a buffer area needs to be set between the LTE cell that uses the shared spectrum and the GSM cell that does not use the shared spectrum. A cell located in the buffer area cannot use the shared spectrum, which also reduces the spectrum resource usage. However, in this embodiment of the present disclosure, when it is implemented that cells of different communications standards simultaneously use a shared spectrum, a frequency number selected from the shared spectrum is not occupied by the second-communications standard channel; therefore it is not required to set a buffer area, which increases the spectrum resource usage.

Figure 6:
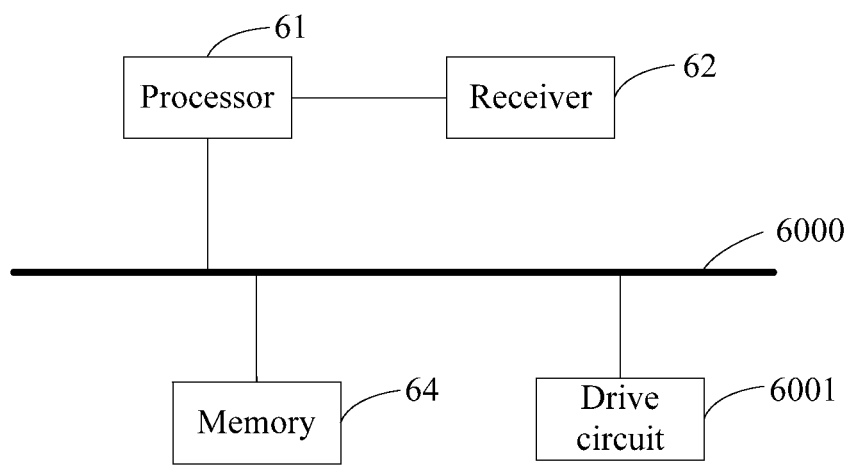
FIG. 6 is a second structural diagram of a base station according to an embodiment of the present disclosure.

As shown in FIG. 6, an embodiment of the present disclosure provides a base station. The base station is a first-communications standard base station and can perform resource allocation on a shared spectrum in a unified manner only in a time domain to implement spectrum resource sharing among different communications standards. The base station includes: a receiver 61, a processor 62, a memory 64, a bus 6000, and a drive circuit 6001.

The receiver 61 is configured to acquire time and frequency information and power of each second-communications standard channel interfering with the first-communications standard base station, where the time and frequency information includes: frequency numbers, timeslot numbers, and Time Division Multiple Access TDMA frame numbers which are obtained when the second-communications standard channels are occupied.

The second-communications standard channels may be channels in a second-communications standard base station or second-communications standard channels in a multi-mode base station that supports a first communications standard and a second communications standard.

The processor 62 is configured to determine, in one transmission time interval according to the time and frequency information of the second-communications standard channels, whether each frequency number in a shared spectrum is occupied by the second-communications standard channels in a TDMA frame timeslot corresponding to the one transmission time interval.

The processor 64 is further configured to: if it is determined that in the one transmission time interval, no frequency number in the shared spectrum is occupied by the second-communications standard channels, enable the first-communications standard base station to use the shared spectrum for uplink and downlink data channel scheduling in the one transmission time interval.

An order of a modulation and coding scheme MCS used when the first-communications standard base station performs the uplink and downlink data channel scheduling is not limited.

In this embodiment of the present disclosure, in one transmission time interval, it may be determined, according to time and frequency information of a second-communications standard channel, whether each frequency number in a shared spectrum is occupied by the second-communications standard channel in a TDMA frame timeslot corresponding to the one transmission time interval; if in the one transmission time interval, no frequency number in the shared spectrum is occupied by the second-communications standard channel, a first-communications standard base station may use the shared spectrum for uplink and downlink data channel scheduling in the one transmission time interval; otherwise, the shared spectrum is still used by a second-communications standard base station, that is, the shared spectrum is dynamically used by a first communications standard and a second communications standard in different transmission time intervals. Compared with the prior art where in one transmission time interval, cells of different communications standards cannot simultaneously use a shared spectrum, this embodiment of the present disclosure enables cells of different communications standards to simultaneously use a shared spectrum in a same period of time, which increases spectrum resource usage.

For implementation of a function of the processor, refer to related descriptions in steps 103 to 104 and in FIG. 2.

In specific implementation of this embodiment, the memory 64 includes at least one or more of the following memory devices: a read-only memory, a random access memory, or a non-volatile random access memory. The memory provides an instruction and data for the processor.

The processor may be an integrated circuit chip and capable of processing a signal. In an implementation process, steps of the foregoing methods may be completed by using an integrated logic circuit in a hardware form or instructions in a software form in the processor. These instructions may cooperate with the processor thereof for implementation and control, so as to execute the methods disclosed in the embodiments of the present disclosure. The foregoing processor may further be a general processor, a digital signal processor (Digital Signal Processor, DSP), an application-specific integrated circuit (application specific integrated circuit), a field programmable gate array (Field Programmable Gate Array, FPGA) or another programmable logic device, a discrete gate or a transistor logic device, or a discrete hardware component.

The foregoing general purpose processor may be a microprocessor or the processor may also be any conventional processor, decoder, and the like. Steps of the methods disclosed with reference to the embodiments of the present disclosure may be directly executed and accomplished by means of a hardware processor, or may be executed and accomplished by using a combination of hardware and software modules in the processor. The software module may be located in a mature storage medium in the field, such as a random access memory, a flash memory, a read-only memory, a programmable read-only memory, an electrically-erasable programmable memory or a register.

The drive circuit 6001 is configured to provide drive for each hardware component in the base station so as to enable the hardware to operate normally.

In addition, hardware components of the base station are coupled by using the bus 6000. In addition to a data bus, the bus 6000 includes a power bus, a control bus, and a status signal bus. However, for clarity, all buses are marked as the bus 6000 in FIG. 6.

The base station in FIG. 6 performs the resource allocation on the shared spectrum in the unified manner only in the time domain to implement the spectrum resource sharing among different communications standards, and reference may be made to related descriptions in the method shown in FIG. 1.

Further, on the basis that the base station shown in FIG. 6 performs the resource allocation on the shared spectrum in the unified manner only in the time domain to implement the spectrum resource sharing, the base station may further perform the resource allocation on the shared spectrum in a unified manner in a frequency domain again, that is, the base station implements the spectrum resource sharing in the time domain first and then in the frequency domain, so as to further increase the spectrum resource usage. Specific implementation is as follows:

Further, the processor is further configured to: if it is determined that one or more frequency numbers in the shared spectrum are occupied by the second-communications standard channels in the one transmission time interval, enable the first-communications standard base station to calculate, by using power of the second-communications standard channels that occupy the one or more frequency numbers, a signal to interference plus noise ratio SINR of the one or more frequency numbers; when the SINR of the one or more frequency numbers is greater than a first threshold, use the shared spectrum for the uplink and downlink data channel scheduling in the one transmission time interval, and determine, according to the SINR of the one or more frequency numbers, the order of the MCS used when the first-communications standard base station performs the uplink and downlink data channel scheduling.

Further, the processor is specifically configured to: when the SINR of the one or more frequency numbers is greater than the first threshold but is less than or equal to a second threshold, determine that the order of the MCS used when the first-mode bases station performs the uplink and downlink data channel scheduling is a target order, where data encoded by using the MCS with the target order can resist interference from the second-communications standard channels during transmission.

The processor is further specifically configured to: when the SINR of the one or more frequency numbers is greater than the second threshold, determine that the order of the MCS used when the first-communications standard base station performs the uplink and downlink data channel scheduling is not limited.

Further, the receiver is specifically configured to receive the time and frequency information and the power of each second-communications standard channel interfering with the first-communications standard base station that are sent by a target network element.

The target network element is any one of the following network elements: a second-communications standard base station controller, an inter-communications standard coordination controller that supports a first communications standard and a second communications standard, a second-communications standard base station, a multimode base station that supports the first communications standard and the second communications standard, or another first-communications standard base station that is adjacent to the first-communications standard base station.

For example, when the first-communications standard base station is an eNodeB in LTE, the target network element may be any one of the following network elements: a GBSC, an inter-communications standard coordination controller that supports GSM and LTE (for example, an eCoordinator), a base station in GSM, an MBTS, or another eNodeB that is adjacent to the eNodeB.

The base station shown in FIG. 6 performs the resource allocation on the shared spectrum in the time domain first and then in the frequency domain, so as to implement the spectrum resource sharing among different communications standards, and reference may be made to related descriptions in the method shown in FIG. 1*a*.

An embodiment of the present disclosure further provides a base station. The base station is a first-communications standard base station and can perform resource allocation on a shared spectrum in a unified manner only in a time domain to implement spectrum resource sharing among different communications standards.

The base station provided by this embodiment of the present disclosure may implement the spectrum resource sharing among different communications standards by using a structure shown in FIG. 6.

The embodiment of the base station shown in FIG. 6 is described by emphasizing manners of performing the resource allocation only in a time domain and performing the resource allocation in the time domain first and then in a frequency domain, whereas this embodiment of the present disclosure is described by emphasizing manners of performing the resource allocation only in a frequency domain and performing the resource allocation in the frequency domain first and then in a time domain.

The base station includes: a receiver, a processor, a memory, a bus, and a drive circuit.

The receiver is configured to acquire frequency domain information and power of each second-communications standard channel interfering with the first-communications standard base station, where the frequency domain information includes: frequency numbers which are obtained when the second-communications standard channels are occupied.

The second-communications standard channels may be channels in a second-communications standard base station or second-communications standard channels in a multimode base station that supports a first communications standard and a second communications standard.

The processor is configured to determine, according to the frequency domain information of the second-communications standard channels, whether each frequency number in the shared spectrum is occupied by the second-communications standard channels.

The processor is further configured to: if it is determined that no frequency number in the shared spectrum is occupied by the second-communications standard channels, enable the first-communications standard base station to use the shared spectrum for uplink and downlink data channel scheduling.

An order of an MCS used when the first-communications standard base station performs the uplink and downlink data channel scheduling is not limited.

For implementation of a function of the processor, refer to descriptions in step 303.

Referring to the foregoing embodiments of the present disclosure, the present disclosure further provides the following instances:

1. A spectrum resource sharing method, including:

acquiring, by a first-communications standard base station, frequency domain information of each second-communications standard channel interfering with the first-communications standard base station, where the frequency domain information includes: frequency numbers which are obtained when the second-communications standard channels are occupied;

determining, by the first-communications standard base station according to the frequency domain information of the second-communications standard channels, whether one or more frequency numbers in a shared spectrum are occupied by the second-communications standard channels; and if no frequency number in the shared spectrum is occupied by the second-communications standard channels, using, by the first-communications standard base station, the shared spectrum for uplink and downlink data channel scheduling in current one transmission time interval.

2. The method according to instance 1, further including:

if in the one transmission time interval, one or more frequency numbers in the shared spectrum are occupied by the second-communications standard channels, skipping using, by the first-communications standard base station, the shared spectrum for the uplink and downlink data channel scheduling in the one transmission time interval.

3. The method according to instance 1, further including:

if in the one transmission time interval, one or more frequency numbers in the shared spectrum are occupied by the second-communications standard channels, using, by the first-communications standard base station, the shared spectrum for the uplink and downlink data channel scheduling when the first-communications standard base station determines that current signal quality meets a preset standard.

4. The method according to instance 3, where that the first-communications standard base station determines that current signal quality meets a preset standard includes:

acquiring, by the first-communications standard base station, power information of each second-communications standard channel interfering with the first-communications standard base station; and obtaining, by the first-communications standard base station by using power of the second-communications standard channels that occupy the one or more frequency numbers, a signal to interference plus noise ratio SINR by means of calculation; and when the SINR is greater than a first threshold, using the shared spectrum for the uplink and downlink data channel scheduling in the one transmission time interval.

5. The method according to instance 4, further including:

determining, according to the SINR, an order of an MCS used when the first-communications standard base station performs the uplink and downlink data channel scheduling.

6. The method according to instance 1, further including:

acquiring, by the first-communications standard base station, time domain information of each second-communications standard channel interfering with the first-communications standard base station, where the time domain information includes: timeslot numbers and/or Time Division Multiple Access TDMA frame numbers which are obtained when the second-communications standard channels are occupied; and if the first-communications standard base station determines, according to the time domain information and the frequency domain information of the second-communications standard channels, that the one or more frequency numbers are occupied by the second-communications standard channels in a TDMA frame timeslot corresponding to the one transmission time interval, skipping using, by the first-communications standard base station, the one or more frequency numbers for the uplink and downlink data channel scheduling.

7. The method according to instance 1, further including:

acquiring, by the first-communications standard base station, time domain information of each second-communications standard channel interfering with the first-communications standard base station, where the time domain information includes: timeslot numbers and/or Time Division Multiple Access TDMA frame numbers which are obtained when the second-communications standard channels are occupied; and if the first-communications standard base station determines, according to the time domain information and the frequency domain information of the second-communications standard channels, that the one or more frequency numbers are occupied by the second-communications standard channels in a TDMA frame timeslot corresponding to the one transmission time interval, using, by the first-communications standard base station, the one or more frequency numbers for the uplink and downlink data channel scheduling when the first-communications standard base station determines that current signal quality meets a preset standard.

8. The method according to instance 7, where that the first-communications standard base station determines that current signal quality meets a preset standard includes:

acquiring, by the first-communications standard base station, power information of each second-communications standard channel that occupies the one or more frequency numbers and interferes with the first-communications standard base station; and calculating, by the first-communications standard base station by using power of the second-communications standard channels that occupy the one or more frequency numbers, a signal to interference plus noise ratio SINR of the one or more frequency numbers; and when the SINR of the one or more frequency numbers is greater than a first threshold, using the one or more frequency numbers for the uplink and downlink data channel scheduling in the one transmission time interval.

9. The method according to instance 8, further including:

determining, according to the SINR of the one or more frequency numbers, an order of an MCS used when the first-communications standard base station performs the uplink and downlink data channel scheduling.

10. The method according to any one of instances 1 to 9, where that the first-communications standard base station acquires any one of or any combination of the frequency domain information, the time domain information, and power of each second-communications standard channel interfering with the first-communications standard base station includes:

receiving, by the first-communications standard base station, any one of or any combination of the frequency domain information, the time domain information, and the power of each second-communications standard channel interfering with the first-communications standard base station that are sent by a target network element, where the target network element is any one of the following network elements: a second-communications standard base station controller, an inter-communications standard coordination controller that supports a first communications standard and a second communications standard, a second-communications standard base station, a multimode base station that supports the first communications standard and the second communications standard, or another first-communications standard base station that is adjacent to the first-communications standard base station.

11. The method according to any one of instances 1 to 10, where when the first-communications standard base station uses the shared spectrum to perform the uplink and downlink data channel scheduling in the current one transmission time interval, the order of the MCS used is not limited.

12. A spectrum resource sharing method, including:

acquiring, by a first-communications standard base station, time domain information of each second-communications standard channel interfering with the first-communications standard base station, where the time domain information includes: timeslot numbers and/or Time Division Multiple Access TDMA frame numbers which are obtained when the second-communications standard channels are occupied;

determining, by the first-communications standard base station in one transmission time interval, whether a shared spectrum is occupied by the second-communications standard channels in a TDMA frame timeslot corresponding to the one transmission time interval; and if in the one transmission time interval, the shared spectrum is not occupied by the second-communications standard channels, using, by the first-communications standard base station, the shared spectrum for uplink and downlink data channel scheduling in the one transmission time interval.

13. The method according to instance 12, further including:

acquiring, by the first-communications standard base station, frequency number information of the shared spectrum; and if in the one transmission time interval, one or more frequency numbers in the shared spectrum are occupied by the second-communications standard channels, skipping using, by the first-communications standard base station, the shared spectrum for the uplink and downlink data channel scheduling in the one transmission time interval.

14. The method according to instance 12, further including:

acquiring, by the first-communications standard base station, frequency number information of the shared spectrum; and if in the one transmission time interval, one or more frequency numbers in the shared spectrum are occupied by the second-communications standard channels, using, by the first-communications standard base station, the shared spectrum for the uplink and downlink data channel scheduling in the one transmission time interval when the first-communications standard base station determines that current signal quality meets a preset standard.

15. The method according to instance 14, where:

that the first-communications standard base station determines that current signal quality meets a preset standard includes:

acquiring, by the first-communications standard base station, power information of each second-communications standard channel interfering with the first-communications standard base station; calculating, by the first-communications standard base station by using power of the second-communications standard channels that occupy the one or more frequency numbers, a signal to interference plus noise ratio SINR; and when the SINR is greater than a first threshold, using the shared spectrum for the uplink and downlink data channel scheduling in the one transmission time interval.

16. The method according to instance 15, further including:

determining, according to the SINR, an order of an MCS used when the first-communications standard base station performs the uplink and downlink data channel scheduling.

17. The method according to any one of instances 12 to 16, where that the first-communications standard base station acquires any one of or any combination of frequency domain information, the time domain information, and power of each second-communications standard channel interfering with the first-communications standard base station includes:

receiving, by the first-communications standard base station, any one of or any combination of the frequency domain information, the time domain information, and the power of each second-communications standard channel interfering with the first-communications standard base station that are sent by a target network element, where the target network element is any one of the following network elements: a second-communications standard base station controller, an inter-communications standard coordination controller that supports a first communications standard and a second communications standard, a second-communications standard base station, a multimode base station that supports the first communications standard and the second communications standard, or another first-communications standard base station that is adjacent to the first-communications standard base station.

18. The method according to any one of instances 12 to 17, where when the first-communications standard base station uses the shared spectrum to perform the uplink and downlink data channel scheduling in the current one transmission time interval, the order of the MCS used is not limited.

19. A base station, where the base station is a first-communications standard base station, including:

an acquiring module, configured to acquire frequency domain information of each second-communications standard channel interfering with the first-communications standard base station, where the frequency domain information includes: frequency numbers which are obtained when the second-communications standard channels are occupied; a determining module, configured to determine, according to the frequency domain information of the second-communications standard channels, whether one or more frequency numbers in a shared spectrum are occupied by the second-communications standard channels; and a resource allocating module, configured to: if no frequency number in the shared spectrum is occupied by the second-communications standard channels, enable the first-communications standard base station to use the shared spectrum for uplink and downlink data channel scheduling in current one transmission time interval.

20. The base station according to instance 19, where:

the resource allocating module is further configured to: when in the one transmission time interval, one or more frequency numbers in the shared spectrum are occupied by the second-communications standard channels, enable the first-communications standard base station not to use the shared spectrum for the uplink and downlink data channel scheduling in the one transmission time interval.

21. The base station according to instance 19, where:

the resource allocating module is further configured to: when in the one transmission time interval, one or more frequency numbers in the shared spectrum are occupied by the second-communications standard channels, enable the first-communications standard base station to use the shared spectrum for the uplink and downlink data channel scheduling when the first-communications standard base station determines that current signal quality meets a preset standard.

22. The base station according to instance 21, where:

the acquiring module is further configured to acquire power information of each second-communications standard channel interfering with the first-communications standard base station; and the resource allocating module is further configured to: obtain, by using power of the second-communications standard channels that occupy the one or more frequency numbers, a signal to interference plus noise ratio SINR by means of calculation; and when the SINR is greater than a first threshold, enable the first-communications standard base station to use the shared spectrum for the uplink and downlink data channel scheduling in the one transmission time interval.

23. The base station according to instance 22, where:

an order of an MCS used when the first-communications standard base station performs the uplink and downlink data channel scheduling is determined according to the SINR.

24. The base station according to instance 19, where:

the acquiring module is further configured to acquire time domain information of each second-communications standard channel interfering with the first-communications standard base station, where the time domain information includes: timeslot numbers and/or Time Division Multiple Access TDMA frame numbers which are obtained when the second-communications standard channels are occupied; and the resource allocating module is further configured to: when it is determined, according to the time domain information and the frequency domain information of the second-communications standard channels, that the one or more frequency numbers are occupied by the second-communications standard channels in a TDMA frame timeslot corresponding to the one transmission time interval, enable the first-communications standard base station not to use the one or more frequency numbers for the uplink and downlink data channel scheduling.

25. The base station according to instance 19, where:

the acquiring module is further configured to acquire time domain information of each second-communications standard channel interfering with the first-communications standard base station, where the time domain information includes: timeslot numbers and/or Time Division Multiple Access TDMA frame numbers which are obtained when the second-communications standard channels are occupied; and the resource allocating module is further configured to: when it is determined, according to the time domain information and the frequency domain information of the second-communications standard channels, that the one or more frequency numbers are occupied by the second-communications standard channels in a TDMA frame timeslot corresponding to the one transmission time interval, enable the first-communications standard base station to use the one or more frequency numbers for the uplink and downlink data channel scheduling when the first-communications standard base station determines that current signal quality meets a preset standard.

26. The base station according to instance 25, where:

the acquiring module is further configured to acquire power information of each second-communications standard channel that occupies the one or more frequency numbers and interferes with the first-communications standard base station; and the resource allocating module is further configured to: calculate, by using power of the second-communications standard channels that occupy the one or more frequency numbers, a signal to interference plus noise ratio SINR of the one or more frequency numbers; and when the SINR of the one or more frequency numbers is greater than a first threshold, enable the first-communications standard base station to use the one or more frequency numbers for the uplink and downlink data channel scheduling in the one transmission time interval.

27. The base station according to instance 26, where:

an order of an MCS used when the first-communications standard base station performs the uplink and downlink data channel scheduling is determined according to the SINR of the one or more frequency numbers.

28. The base station according to any one of instances 19 to 27, where:

that the acquiring module acquires any one of or any combination of the frequency domain information, the time domain information, and power of each second-communications standard channel interfering with the first-communications standard base station includes:

receiving, by the first-communications standard base station, any one of or any combination of the frequency domain information, the time domain information, and the power of each second-communications standard channel interfering with the first-communications standard base station that are sent by a target network element, where the target network element is any one of the following network elements: a second-communications standard base station controller, an inter-communications standard coordination controller that supports a first communications standard and a second communications standard, a second-communications standard base station, a multimode base station that supports the first communications standard and the second communications standard, or another first-communications standard base station that is adjacent to the first-communications standard base station.

29. The base station according to any one of instances 19 to 28, where:

when the first-communications standard base station uses the shared spectrum to perform the uplink and downlink data channel scheduling in the current one transmission time interval, the order of the MCS used is not limited.

30. A base station, where the base station is a first-communications standard base station, including:

an acquiring module, configured to acquire time domain information of each second-communications standard channel interfering with the first-communications standard base station, where the time domain information includes: timeslot numbers and/or Time Division Multiple Access TDMA frame numbers which are obtained when the second-communications standard channels are occupied;

a determining module, configured to: in one transmission time interval, determine whether a shared spectrum is occupied by the second-communications standard channels in a TDMA frame timeslot corresponding to the one transmission time interval; and a resource allocating module, configured to: when in the one transmission time interval, the shared spectrum is not occupied by the second-communications standard channels, enable the first-communications standard base station to use the shared spectrum for uplink and downlink data channel scheduling in the one transmission time interval.

31. The base station according to instance 30, where:

the acquiring module is further configured to acquire frequency number information of the shared spectrum; and the resource allocating module is further configured to: when in the one transmission time interval, one or more frequency numbers in the shared spectrum are occupied by the second-communications standard channels, enable the first-communications standard base station not to use the shared spectrum for the uplink and downlink data channel scheduling in the one transmission time interval.

32. The base station according to instance 30, where:
the acquiring module is further configured to acquire frequency number information of the shared spectrum; and
the resource allocating module is further configured to: when in the one transmission time interval, one or more frequency numbers in the shared spectrum are occupied by the second-communications standard channels, enable the first-communications standard base station to use the shared spectrum for the uplink and downlink data channel scheduling in the one transmission time interval when the first-communications standard base station determines that current signal quality meets a preset standard.

33. The base station according to instance 32, where:
the acquiring module is further configured to acquire power information of each second-communications standard channel interfering with the first-communications standard base station; and
the resource allocating module is further configured to: calculate, by using power of the second-communications standard channels that occupy the one or more frequency numbers, a signal to interference plus noise ratio SINR; and when the SINR is greater than a first threshold, enable the first-communications standard base station to use the shared spectrum for the uplink and downlink data channel scheduling in the one transmission time interval.

34. The base station according to instance 33, where an order of an MCS used when the first-communications standard base station performs the uplink and downlink data channel scheduling is determined according to the SINR.

35. The base station according to any one of instances 30 to 34, where that the acquiring module acquires any one of or any combination of frequency domain information, the time domain information, and power of each second-communications standard channel interfering with the first-communications standard base station includes:
receiving, by the first-communications standard base station, any one of or any combination of the frequency domain information, the time domain information, and the power of each second-communications standard channel interfering with the first-communications standard base station that are sent by a target network element, where
the target network element is any one of the following network elements: a second-communications standard base station controller, an inter-communications standard coordination controller that supports a first communications standard and a second communications standard, a second-communications standard base station, a multimode base station that supports the first communications standard and the second communications standard, or another first-communications standard base station that is adjacent to the first-communications standard base station.

36. The base station according to any one of instances 30 to 35, where when the first-communications standard base station uses the shared spectrum to perform the uplink and downlink data channel scheduling in the current one transmission time interval, the order of the MCS used is not limited.

37. A base station, where the base station is a first-communications standard base station, including:
a receiver, configured to acquire frequency domain information of each second-communications standard channel interfering with the first-communications standard base station, where the frequency domain information includes: frequency numbers which are obtained when the second-communications standard channels are occupied; and
a processor, configured to determine, according to the frequency domain information of the second-communications standard channels, whether one or more frequency numbers in a shared spectrum are occupied by the second-communications standard channels, where
the processor is further configured to: when no frequency number in the shared spectrum is occupied by the second-communications standard channels, enable the first-communications standard base station to use the shared spectrum for uplink and downlink data channel scheduling in current one transmission time interval.

38. The base station according to instance 37, where:
the processor is further configured to: when in the one transmission time interval, one or more frequency numbers in the shared spectrum are occupied by the second-communications standard channels, enable the first-communications standard base station not to use the shared spectrum for the uplink and downlink data channel scheduling in the one transmission time interval.

39. The base station according to instance 37, where:
the processor is further configured to: when in the one transmission time interval, one or more frequency numbers in the shared spectrum are occupied by the second-communications standard channels, enable the first-communications standard base station to use the shared spectrum for the uplink and downlink data channel scheduling when the first-communications standard base station determines that current signal quality meets a preset standard.

40. The base station according to instance 39, where:
the receiver is further configured to acquire power information of each second-communications standard channel interfering with the first-communications standard base station; and
the processor is further configured to: obtain, by using power of the second-communications standard channels that occupy the one or more frequency numbers, a signal to interference plus noise ratio SINR by means of calculation; and when the SINR is greater than a first threshold, enable the first-communications standard base station to use the shared spectrum for the uplink and downlink data channel scheduling in the one transmission time interval.

41. The base station according to instance 40, where:
an order of an MCS used when the first-communications standard base station performs the uplink and downlink data channel scheduling is determined according to the SINR.

42. The base station according to instance 37, where:
the receiver is further configured to acquire time domain information of each second-communications standard channel interfering with the first-communications standard base station, where the time domain information includes: timeslot numbers and/or Time Division Multiple Access TDMA frame numbers which are obtained when the second-communications standard channels are occupied; and
the processor is further configured to: when it is determined, according to the time domain information and the frequency domain information of the second-communications standard channels, that the one or more frequency numbers are occupied by the second-communications standard channels in a TDMA frame timeslot corresponding to the one transmission time interval, enable the first-communications standard base station not to use the one or more frequency numbers for the uplink and downlink data channel scheduling.

43. The base station according to instance 37, where:
the receiver is further configured to acquire time domain information of each second-communications standard channel interfering with the first-communications standard base station, where the time domain information includes: timeslot numbers and/or Time Division Multiple Access TDMA frame numbers which are obtained when the second-communications standard channels are occupied; and
the processor is further configured to: when it is determined, according to the time domain information and the frequency domain information of the second-communications standard channels, that the one or more frequency numbers are occupied by the second-communications standard channels in a TDMA frame timeslot corresponding to the one transmission time interval, enable the first-communications standard base station to use the one or more frequency numbers for the uplink and downlink data channel scheduling when the first-communications standard base station determines that current signal quality meets a preset standard.

44. The base station according to instance 43, where:
the receiver is further configured to acquire power information of each second-communications standard channel that occupies the one or more frequency numbers and interferes with the first-communications standard base station; and
the processor is further configured to: calculate, by using power of the second-communications standard channels that occupy the one or more frequency numbers, a signal to interference plus noise ratio SINR of the one or more frequency numbers; and when the SINR of the one or more frequency numbers is greater than a first threshold, enable the first-communications standard base station to use the one or more frequency numbers for the uplink and downlink data channel scheduling in the one transmission time interval.

45. The base station according to instance 44, where:
an order of an MCS used when the first-communications standard base station performs the uplink and downlink data channel scheduling is determined according to the SINR of the one or more frequency numbers.

46. The base station according to any one of instances 37 to 45, where:
that the receiver acquires any one of or any combination of the frequency domain information, the time domain information, and power of each second-communications standard channel interfering with the first-communications standard base station includes:
receiving, by the first-communications standard base station, any one of or any combination of the frequency domain information, the time domain information, and the power of each second-communications standard channel interfering with the first-communications standard base station that are sent by a target network element, where
the target network element is any one of the following network elements: a second-communications standard base station controller, an inter-communications standard coordination controller that supports a first communications standard and a second communications standard, a second-communications standard base station, a multimode base station that supports the first communications standard and the second communications standard, or another first-communications standard base station that is adjacent to the first-communications standard base station.

47. The base station according to any one of instances 37 to 46, where:
when the first-communications standard base station uses the shared spectrum to perform the uplink and downlink data channel scheduling in the current one transmission time interval, the order of the MCS used is not limited.

48. A base station, where the base station is a first-communications standard base station, including:
a receiver, configured to acquire time domain information of each second-communications standard channel interfering with the first-communications standard base station, where the time domain information includes: timeslot numbers and/or Time Division Multiple Access TDMA frame numbers which are obtained when the second-communications standard channels are occupied; and
a processor, configured to: in one transmission time interval, determine whether a shared spectrum is occupied by the second-communications standard channels in a TDMA frame timeslot corresponding to the one transmission time interval, where
the processor is further configured to: when in the one transmission time interval, the shared spectrum is not occupied by the second-communications standard channels, enable the first-communications standard base station to use the shared spectrum for uplink and downlink data channel scheduling in the one transmission time interval.

49. The base station according to instance 48, where:
the receiver is further configured to acquire frequency number information of the shared spectrum; and
the processor is further configured to: when in the one transmission time interval, one or more frequency numbers in the shared spectrum are occupied by the second-communications standard channels, enable the first-communications standard base station not to use the shared spectrum for the uplink and downlink data channel scheduling in the one transmission time interval.

50. The base station according to instance 48, where:
the receiver is further configured to acquire frequency number information of the shared spectrum; and
the processor is further configured to: when in the one transmission time interval, one or more frequency numbers in the shared spectrum are occupied by the second-communications standard channels, enable the first-communications standard base station to use the shared spectrum for the uplink and downlink data channel scheduling in the one transmission time interval when the first-communications standard base station determines that current signal quality meets a preset standard.

51. The base station according to instance 50, where:
the receiver is further configured to acquire power information of each second-communications standard channel interfering with the first-communications standard base station; and
the processor is further configured to: calculate, by using power of the second-communications standard channels that occupy the one or more frequency numbers, a signal to interference plus noise ratio SINR; and when the SINR is greater than a first threshold, enable the first-communications standard base station to use the shared spectrum for the uplink and downlink data channel scheduling in the one transmission time interval.

52. The base station according to instance 51, where an order of an MCS used when the first-communications standard base station performs the uplink and downlink data channel scheduling is determined according to the SINR.

53. The base station according to any one of instances 48 to 52, where that the receiver acquires any one of or any combination of frequency domain information, the time domain information, and power of each second-communications standard channel interfering with the first-communications standard base station includes:

receiving, by the first-communications standard base station, any one of or any combination of the frequency domain information, the time domain information, and the power of each second-communications standard channel interfering with the first-communications standard base station that are sent by a target network element, where the target network element is any one of the following network elements: a second-communications standard base station controller, an inter-communications standard coordination controller that supports a first communications standard and a second communications standard, a second-communications standard base station, a multimode base station that supports the first communications standard and the second communications standard, or another first-communications standard base station that is adjacent to the first-communications standard base station.

54. The base station according to any one of instances 48 to 53, where when the first-communications standard base station uses the shared spectrum to perform the uplink and downlink data channel scheduling in the current one transmission time interval, the order of the MCS used is not limited.

In specific implementation of this embodiment, the memory includes at least one or more of the following memory devices: a read-only memory, a random access memory, or a non-volatile random access memory. The memory provides an instruction and data for the processor.

The processor may be an integrated circuit chip and capable of processing a signal. In an implementation process, steps of the foregoing methods may be completed by using an integrated logic circuit in a hardware form or instructions in a software form in the processor. These instructions may cooperate with the processor thereof for implementation and control, so as to execute the methods disclosed in the embodiments of the present disclosure. The foregoing processor may further be a general processor, a digital signal processor (Digital Signal Processing, DSP), an application-specific integrated circuit (application specific integrated circuit), a field programmable gate array (Field Programmable Gate Array, FPGA) or another programmable logic device, a discrete gate or a transistor logic device, or a discrete hardware component.

The foregoing general purpose processor may be a microprocessor or the processor may also be any conventional processor, decoder, and the like. Steps of the methods disclosed with reference to the embodiments of the present disclosure may be directly executed and accomplished by means of a hardware processor, or may be executed and accomplished by using a combination of hardware and software modules in the processor. The software module may be located in a mature storage medium in the field, such as a random access memory, a flash memory, a read-only memory, a programmable read-only memory, an electrically-erasable programmable memory or a register.

The drive circuit is configured to provide drive for hardware in the base station so as to enable the hardware to operate normally.

In addition, each hardware component of the base station are coupled by using the bus. In addition to a data bus, the bus includes a power bus, a control bus, and a status signal bus.

In this embodiment of the present disclosure, it may be determined, according to frequency domain information of a second-communications standard channel, whether each frequency number in a shared spectrum is occupied by the second-communications standard channel; if no frequency number in the shared spectrum is occupied by the second-communications standard channel, a first-communications standard base station uses the shared spectrum for uplink and downlink data channel scheduling in current one transmission time interval; otherwise, the shared spectrum is still used by the second-communications standard channel, that is, the shared spectrum is dynamically used by a first communications standard and a second communications standard in different transmission time intervals. Compared with the prior art where in a same period of time, cells of different communications standards cannot simultaneously use a shared spectrum, this embodiment of the present disclosure enables cells of different communications standards to simultaneously use a shared spectrum in a same period of time, which increases spectrum resource usage.

In this embodiment, the base station performs the resource allocation on the shared spectrum in the unified manner only in the frequency domain to implement the spectrum resource sharing among different communications standards, and reference may be made to related descriptions in the method shown in FIG. 3.

Further, on the basis that the base station performs the resource allocation on the shared spectrum in the unified manner only in the frequency domain to implement the spectrum resource sharing, the base station may further perform, the resource allocation on the shared spectrum in a unified manner in a time domain again, that is, the base station implements the spectrum resource sharing in the frequency domain first and then in the time domain, so as to further increase the spectrum resource usage. Specific implementation is as follows:

The receiver is further configured to acquire time domain information of each second-communications standard channel interfering with the first-communications standard base station, where the time domain information includes: timeslot numbers and Time Division Multiple Access TDMA frame numbers which are obtained when the second-communications standard channels are occupied. The processor is further configured to: if it is determined that one or more frequency numbers in the shared spectrum are occupied by the second-communications standard channels, determine, according to the time domain information and the frequency domain information of the second-communications standard channels, whether the one or more frequency numbers are occupied by the second-communications standard channels in a TDMA frame timeslot corresponding to one transmission time interval. The processor is further configured to: if it is determined that the one or more frequency numbers are not occupied by the second-communications standard channels in the TDMA frame timeslot corresponding to the one transmission time interval, use the shared spectrum for the uplink and downlink data channel scheduling, where the order of the MCS used when the first-communications standard base station performs the uplink and downlink data channel scheduling is not limited.

The processor is further configured to: if it is determined that the one or more frequency numbers are occupied by the second-communications standard channels in the TDMA frame timeslot corresponding to the one transmission time interval, calculate, by using power of the second-communications standard channels that occupy the one or more frequency numbers, a signal to interference plus noise ratio SINR of the one or more frequency numbers; when the SINR of the one or more frequency numbers is greater than a first threshold, use the shared spectrum for the uplink and downlink data channel scheduling in the one transmission time interval, and determine, according to the SINR of the one or more frequency numbers, the order of the MCS used when the first-communications standard base station performs the uplink and downlink data channel scheduling.

Further, the receiver is specifically configured to receive the time domain information, the frequency domain, and the power of each second-communications standard channel interfering with the first-communications standard base station that are sent by a target network element.

The target network element is any one of the following network elements: a second-communications standard base station controller, an inter-communications standard coordination controller that supports a first communications standard and a second communications standard, a second-communications standard base station, a multimode base station that supports the first communications standard and the second communications standard, or another first-communications standard base station that is adjacent to the first-communications standard base station.

For example, when the first-communications standard base station is an eNodeB in LTE, the target network element may be any one of the following network elements: a GBSC, an inter-communications standard coordination controller that supports GSM and LTE (for example, an eCoordinator), a base station in GSM, an MBTS, or another eNodeB that is adjacent to the eNodeB.

In this embodiment, the base station performs the resource allocation on the shared spectrum in the frequency domain first and then in the time domain, so as to implement the spectrum resource sharing among different communications standards, and reference may be made to related descriptions in the method shown in FIG. 4.

In this embodiment of the present disclosure, it may be determined, according to frequency domain information of a second-communications standard channel, whether each frequency number in a shared spectrum is occupied by the second-communications standard channel; if no frequency number in the shared spectrum is occupied by the second-communications standard channel, a first-communications standard base station uses the shared spectrum for uplink and downlink data channel scheduling in current one transmission time interval; otherwise, it is further determined, in a time domain, whether a frequency number is occupied by the second-communications standard channel in a TDMA frame timeslot corresponding to the current one transmission time interval, and if the frequency number is not occupied or is occupied but an SINR of the frequency number is greater than a first threshold, the shared spectrum is used for the uplink and downlink data channel scheduling in the one transmission time interval. Compared with the prior art where in a same period of time, cells of different communications standards cannot simultaneously use a shared spectrum, this embodiment of the present disclosure enables cells of different communications standards to simultaneously use a shared spectrum in a same period of time, which increases spectrum resource usage.

In addition, in a method in the prior art, to decrease co-channel interference between an LTE cell that uses a shared spectrum and a GSM cell that does not use the shared spectrum, a buffer area needs to be set between the LTE cell that uses the shared spectrum and the GSM cell that does not use the shared spectrum. A cell located in the buffer area cannot use the shared spectrum, which also reduces the spectrum resource usage. However, in this embodiment of the present disclosure, when it is implemented that cells of different communications standards simultaneously use a shared spectrum, a frequency number selected from the shared spectrum is not occupied by the second-communications standard channel; therefore it is not required to set a buffer area, which increases the spectrum resource usage.

Based on the foregoing descriptions of the embodiments, a person skilled in the art may clearly understand that the present disclosure may be implemented by software in addition to necessary universal hardware or by hardware only. In most circumstances, the former is a preferred implementation manner. Based on such an understanding, the technical solutions of the present disclosure essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present disclosure.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A spectrum resource sharing method, comprising:
   acquiring, by a first-communications standard base station, frequency domain information of each second-communications standard channel interfering with the first-communications standard base station, wherein the frequency domain information comprises: frequency numbers which are obtained when the second-communications standard channels are occupied;
   determining, by the first-communications standard base station according to the frequency domain information of the second-communications standard channels, whether one or more frequency numbers in a shared spectrum are occupied by the second-communications standard channels; and
   when no frequency number in the shared spectrum is occupied by the second-communications standard channels, using, by the first-communications standard base station, the shared spectrum for uplink and downlink data channel scheduling in one transmission time interval.

2. The method according to claim 1, further comprising:
   when in the one transmission time interval, one or more frequency numbers in the shared spectrum are occupied by the second-communications standard channels, skipping the using, by the first-communications standard base station, the shared spectrum for the uplink and downlink data channel scheduling in the one transmission time interval.

3. The method according to claim 1, further comprising:
   when in the one transmission time interval, one or more frequency numbers in the shared spectrum are occupied by the second-communications standard channels, using, by the first-communications standard base station, the shared spectrum for the uplink and downlink data channel scheduling when the first-communications standard base station determines that a current signal quality meets a preset standard.

4. The method according to claim 3, wherein that the first-communications standard base station determines that the current signal quality meets the preset standard comprises:

acquiring, by the first-communications standard base station, power information of each second-communications standard channel interfering with the first-communications standard base station; and obtaining, by the first-communications standard base station, a signal to interference plus noise ratio (SINR) by using power information of the second-communications standard channels that occupy the one or more frequency numbers; and when the SINR is greater than a first threshold, using the shared spectrum for the uplink and downlink data channel scheduling in the one transmission time interval.

5. The method according to claim 4, further comprising:

determining, according to the SINR, an order of a modulation and coding scheme (MCS) used when the first-communications standard base station performs the uplink and downlink data channel scheduling.

6. The method according to claim 1, further comprising:

acquiring, by the first-communications standard base station, time domain information of each second-communications standard channel interfering with the first-communications standard base station, wherein the time domain information comprises timeslot numbers and/or Time Division Multiple Access (TDMA) frame numbers which are obtained when the second-communications standard channels are occupied; and when the first-communications standard base station determines, according to the time domain information and the frequency domain information of the second-communications standard channels, that the one or more frequency numbers are occupied by the second-communications standard channels in a TDMA frame timeslot corresponding to the one transmission time interval, skipping the using, by the first-communications standard base station, the one or more frequency numbers for the uplink and downlink data channel scheduling.

7. The method according to claim 1, further comprising:

acquiring, by the first-communications standard base station, time domain information of the second-communications standard channels interfering with the first-communications standard base station, wherein the time domain information comprises: timeslot numbers and/or Time Division Multiple Access (TDMA) frame numbers which are obtained when the second-communications standard channels are occupied; and when the first-communications standard base station determines, according to the time domain information and the frequency domain information of the second-communications standard channels, that the one or more frequency numbers are occupied by the second-communications standard channels in a (TDMA) frame timeslot corresponding to the one transmission time interval, using, by the first-communications standard base station, the one or more frequency numbers for the uplink and downlink data channel scheduling when the first-communications standard base station determines that a current signal quality meets a preset standard.

8. A spectrum resource sharing method, comprising:

acquiring, by a first-communications standard base station, time domain information of each second-communications standard channel interfering with the first-communications standard base station, wherein the time domain information comprises timeslot numbers and/or Time Division Multiple Access (TDMA) frame numbers which are obtained when the second-communications standard channels are occupied;

determining, by the first-communications standard base station in one transmission time interval, whether a shared spectrum is occupied by the second-communications standard channels in a TDMA frame timeslot corresponding to the one transmission time interval; and when in the one transmission time interval, the shared spectrum is not occupied by the second-communications standard channels, using, by the first-communications standard base station, the shared spectrum for uplink and downlink data channel scheduling in the one transmission time interval.

9. The method according to claim 8, further comprising:

acquiring, by the first-communications standard base station, frequency number information of the shared spectrum; and when in the one transmission time interval, one or more frequency numbers in the shared spectrum are occupied by the second-communications standard channels, skipping the step of using, by the first-communications standard base station, the shared spectrum for the uplink and downlink data channel scheduling in the one transmission time interval.

10. The method according to claim 8, further comprising:

acquiring, by the first-communications standard base station, frequency number information of the shared spectrum; and when in the one transmission time interval, one or more frequency numbers in the shared spectrum are occupied by the second-communications standard channels, using, by the first-communications standard base station, the shared spectrum for the uplink and downlink data channel scheduling in the one transmission time interval when the first-communications standard base station determines that a current signal quality meets a preset standard.

11. The method according to claim 10, wherein the first-communications standard base station determines that the current signal quality meets the preset standard comprises:

acquiring, by the first-communications standard base station, power information of each second-communications standard channel interfering with the first-communications standard base station;

obtaining, by the first-communications standard base station, a signal to interference plus noise ratio (SINR) by using power information of the second-communications standard channels that occupy the one or more frequency numbers; and when the SINR is greater than a first threshold, using the shared spectrum for the uplink and downlink data channel scheduling in the one transmission time interval.

12. The method according to claim 11, further comprising:

determining, according to the SINR, an order of a modulation and coding scheme (MCS) used when the first-communications standard base station performs the uplink and downlink data channel scheduling.

13. A base station, wherein the base station is a first-communications standard base station, comprising:

a receiver, configured to acquire frequency domain information of each second-communications standard channel interfering with the first-communications standard base station, wherein the frequency domain information comprises frequency numbers which are obtained when the second-communications standard channels are occupied; and a processor, configured to determine, according to the frequency domain information of the second-communications standard channels, whether one or more frequency numbers in a shared spectrum are occupied by the second-communications standard channels;

wherein the processor is further configured to when no frequency number in the shared spectrum is occupied by the second-communications standard channels, enable the first-communications standard base station to use the shared spectrum for uplink and downlink data channel scheduling in a current one transmission time interval.

14. The base station according to claim 13, wherein the processor is further configured to: when in the one transmission time interval, one or more frequency numbers in the shared spectrum are occupied by the second-communications standard channels, enable the first-communications standard base station to not use the shared spectrum for the uplink and downlink data channel scheduling in the one transmission time interval.

15. The base station according to claim 13, wherein the processor is further configured to: when in the one transmission time interval, one or more frequency numbers in the shared spectrum are occupied by the second-communications standard channels, enable the first-communications standard base station to use the shared spectrum for the uplink and downlink data channel scheduling when the first-communications standard base station determines that a current signal quality meets a preset standard.

16. The base station according to claim 15, wherein:
the receiver is further configured to acquire power information of each second-communications standard channel interfering with the first-communications standard base station;
the processor is further configured to obtain, by using power information of the second-communications standard channels that occupy the one or more frequency numbers, a signal to interference plus noise ratio (SINR) by means of calculation; and
when the SINR is greater than a first threshold, enable the first-communications standard base station to use the shared spectrum for the uplink and downlink data channel scheduling in the one transmission time interval.

17. The base station according to claim 16, wherein:
an order of a modulation and coding scheme (MCS) used when the first-communications standard base station performs the uplink and downlink data channel scheduling is determined according to the SINR.

18. The base station according to claim 13, wherein:
the receiver is further configured to acquire time domain information of each second-communications standard channel interfering with the first-communications standard base station, wherein the time domain information comprises timeslot numbers and/or Time Division Multiple Access (TDMA) frame numbers which are obtained when the second-communications standard channels are occupied; and
the processor is further configured to: when it is determined, according to the time domain information and the frequency domain information of the second-communications standard channels, that the one or more frequency numbers are occupied by the second-communications standard channels in a TDMA frame timeslot corresponding to the one transmission time interval, enable the first-communications standard base station to not use the one or more frequency numbers for the uplink and downlink data channel scheduling.

19. The base station according to claim 13, wherein:
the receiver is further configured to acquire time domain information of each second-communications standard channel interfering with the first-communications standard base station, wherein the time domain information comprises: timeslot numbers and/or Time Division Multiple Access (TDMA) frame numbers which are obtained when the second-communications standard channels are occupied; and
the processor is further configured to: when it is determined, according to the time domain information and the frequency domain information of the second-communications standard channels, that the one or more frequency numbers are occupied by the second-communications standard channels in a TDMA frame timeslot corresponding to the one transmission time interval, enable the first-communications standard base station to use the one or more frequency numbers for the uplink and downlink data channel scheduling when the first-communications standard base station determines that a current signal quality meets a preset standard.

20. A base station, wherein the base station is a first-communications standard base station, comprising:
a receiver, configured to acquire time domain information of each second-communications standard channel interfering with the first-communications standard base station, wherein the time domain information comprises: timeslot numbers and/or Time Division Multiple Access (TDMA) frame numbers which are obtained when the second-communications standard channels are occupied; and
a processor, configured to in one transmission time interval, determine whether a shared spectrum is occupied by the second-communications standard channels in a TDMA frame timeslot corresponding to the one transmission time interval;
wherein the processor is further configured to: when in the one transmission time interval, the shared spectrum is not occupied by the second-communications standard channels, enable the first-communications standard base station to use the shared spectrum for uplink and downlink data channel scheduling in the one transmission time interval.

21. The base station according to claim 20, wherein:
the receiver is further configured to acquire frequency number information of the shared spectrum; and
the processor is further configured to when in the one transmission time interval, one or more frequency numbers in the shared spectrum are occupied by the second-communications standard channels, enable the first-communications standard base station to not use the shared spectrum for the uplink and downlink data channel scheduling in the one transmission time interval.

22. The base station according to claim 21, wherein:
the receiver is further configured to acquire frequency number information of the shared spectrum; and the processor is further configured to when in the one transmission time interval, one or more frequency numbers in the shared spectrum are occupied by the second-communications standard channels, enable the first-communications standard base station to use the shared spectrum for the uplink and downlink data channel scheduling in the one transmission time interval when the first-communications standard base station determines that a current signal quality meets a preset standard.

23. The base station according to claim 22, wherein:
the receiver is further configured to acquire power information of each second-communications standard channel interfering with the first-communications standard base station;
the processor is further configured to obtain, by using power information of the second-communications standard channels that occupy the one or more frequency numbers, a signal to interference plus noise ratio (SINR); and
when the SINR is greater than a first threshold, enable the first-communications standard base station to use the shared spectrum for the uplink and downlink data channel scheduling in the one transmission time interval.

24. The base station according to claim 23, wherein an order of a modulation and coding scheme (MCS) used when the first-communications standard base station performs the uplink and downlink data channel scheduling is determined according to the SINR.

* * * * *